US012795025B2

(12) United States Patent
Matsuo

(10) Patent No.: US 12,795,025 B2
(45) Date of Patent: Nov. 10, 2026

(54) IMAGE READING APPARATUS INCLUDING A SHEET CONVEYANCE MECHANISM, A SHEET CONVEYANCE GUIDE, AND AN IMAGE READING UNIT

(71) Applicant: CANON KABUSHIKI KAISHA, Tokyo (JP)

(72) Inventor: Kazuki Matsuo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 236 days.

(21) Appl. No.: 18/655,149

(22) Filed: May 3, 2024

(65) Prior Publication Data

US 2024/0397006 A1 Nov. 28, 2024

(30) Foreign Application Priority Data

May 23, 2023 (JP) ................................ 2023-084518

(51) Int. Cl.
*H04N 1/00* (2006.01)
*H04N 1/12* (2006.01)

(52) U.S. Cl.
CPC ......... *H04N 1/00761* (2013.01); *H04N 1/123* (2013.01); *H04N 2201/02497* (2013.01)

(58) Field of Classification Search
CPC ............... H04N 1/00761; H04N 1/123; H04N 2201/02497
See application file for complete search history.

(56) References Cited

U.S. PATENT DOCUMENTS

| | | | | |
|---|---|---|---|---|
| 7,166,827 | B2 * | 1/2007 | Sugihara | H10F 39/198 358/475 |
| 11,370,633 | B2 * | 6/2022 | Sato | B65H 31/02 |
| 2012/0001386 | A1 * | 1/2012 | Nishikata | B65H 7/14 271/265.01 |
| 2013/0307893 | A1 * | 11/2013 | Suda | B41J 2/01 347/104 |
| 2014/0118753 | A1 * | 5/2014 | Minakuchi | H04N 1/3875 358/1.2 |
| 2016/0033918 | A1 * | 2/2016 | Taniguchi | B65H 9/004 399/16 |
| 2017/0174453 | A1 * | 6/2017 | Akai | B65H 3/128 |
| 2018/0234576 | A1 * | 8/2018 | Otaka | G03G 15/602 |
| 2019/0161311 | A1 * | 5/2019 | Takahashi | B65H 31/22 |
| 2019/0174022 | A1 * | 6/2019 | Ogino | H04N 1/207 |
| 2019/0377295 | A1 * | 12/2019 | Igarashi | G03G 15/5016 |

(Continued)

FOREIGN PATENT DOCUMENTS

JP 2003-046722 2/2003

*Primary Examiner* — Ming Y Hon
(74) *Attorney, Agent, or Firm* — Venable LLP

(57) ABSTRACT

An image reading apparatus for reading an image on a sheet while conveying the sheet, the image reading apparatus including a conveyance mechanism configured to convey the sheet, a reading unit capable of reading the image on the sheet, and a conveyance guide configured to guide the sheet, the conveyance guide configured to be attachable and detachable with respect to a predetermined position of the image reading apparatus, wherein the reading unit is configured to be movable between a reading position for reading the image on the sheet and a detection position at which the reading unit detects whether the conveyance guide is attached to the predetermined position.

15 Claims, 30 Drawing Sheets

(56) References Cited

U.S. PATENT DOCUMENTS

| | | | | |
|---|---|---|---|---|
| 2021/0178786 | A1* | 6/2021 | Izoe | B65H 23/14 |
| 2022/0026837 | A1* | 1/2022 | Hase | G03G 15/2064 |
| 2022/0127092 | A1* | 4/2022 | Yamada | H04N 1/0066 |
| 2025/0280082 | A1* | 9/2025 | Kurahashi | H04N 1/00602 |
| 2025/0360737 | A1* | 11/2025 | Iida | B41J 29/393 |

* cited by examiner

B-B CROSS SECTIONAL VIEW

A-A CROSS SECTIONAL VIEW

ENLARGED VIEW OF PORTION C

F-F CROSS SECTIONAL VIEW

G-G CROSS SECTIONAL VIEW

IMAGE READING APPARATUS INCLUDING A SHEET CONVEYANCE MECHANISM, A SHEET CONVEYANCE GUIDE, AND AN IMAGE READING UNIT

CROSS-REFERENCE TO PRIORITY APPLICATION

This application claims the benefit of Japanese Patent Application No. 2023-084518, filed on May 23, 2023, which is hereby incorporated by reference herein in its entirety.

BACKGROUND OF THE INVENTION

Field of the Invention

The present invention relates to an image reading apparatus for reading an image on a document.

Description of the Related Art

Conventionally, copying machines and multifunction apparatuses are known that are equipped with an image reading apparatus for reading documents. As such an image reading apparatus, a configuration is known that includes an image sensor unit for reading an image on a document, and a conveyance device such as an Auto Document Feeder (ADF), which can automatically convey sheet-shaped documents. When the conveyance device conveys a sheet through a reading portion, the image sensor unit reads the image on the sheet.

Japanese Patent Application Publication No. 2003-46722 discloses an image reading apparatus that includes a conveyance device. A sheet conveyance guide is removably attached to the main body of the image reading apparatus.

SUMMARY OF THE INVENTION

In the above configuration, when a sheet is conveyed while the guide unit, such as the removable sheet conveyance guide, is removed from the main body, the sheet may not be conveyed normally and may jam inside of the image reading apparatus. A sheet may also jam when it is conveyed while the sheet conveyance guide is not attached to a predetermined position.

In view of the foregoing issues, it is an object of the present invention to provide an image reading apparatus that is capable of limiting sheet jamming.

In order to achieve the object described above, an image reading apparatus according to the present invention includes a conveyance mechanism configured to convey the sheet, a guide unit configured to guide the sheet, the guide unit configured to be attachable and detachable with respect to a predetermined position of the image reading apparatus, and a detector configured to detect whether the guide unit is attached to the predetermined position.

Furthermore, in order to achieve the object described above, an image reading apparatus according to the present invention includes, a conveyance mechanism configured to convey the sheet, a guide unit configured to be attachable and detachable with respects to the image reading apparatus, the guide unit configured to guide the sheet, a light unit including a light projection portion configured to project light toward the guide unit and a sensor portion configured to detect light projected by the light projection portion, and a control portion configured to perform a reading operation of reading the image on the sheet while conveying the sheet and configured to determine whether to perform the reading operation on the basis of a detection result of the sensor portion.

According to the present invention, an image reading apparatus capable of limiting sheet jamming is provided.

Further features of the present invention will become apparent from the following description of exemplary embodiments with reference to the attached drawings.

DESCRIPTION OF THE EMBODIMENTS

Figure 1:
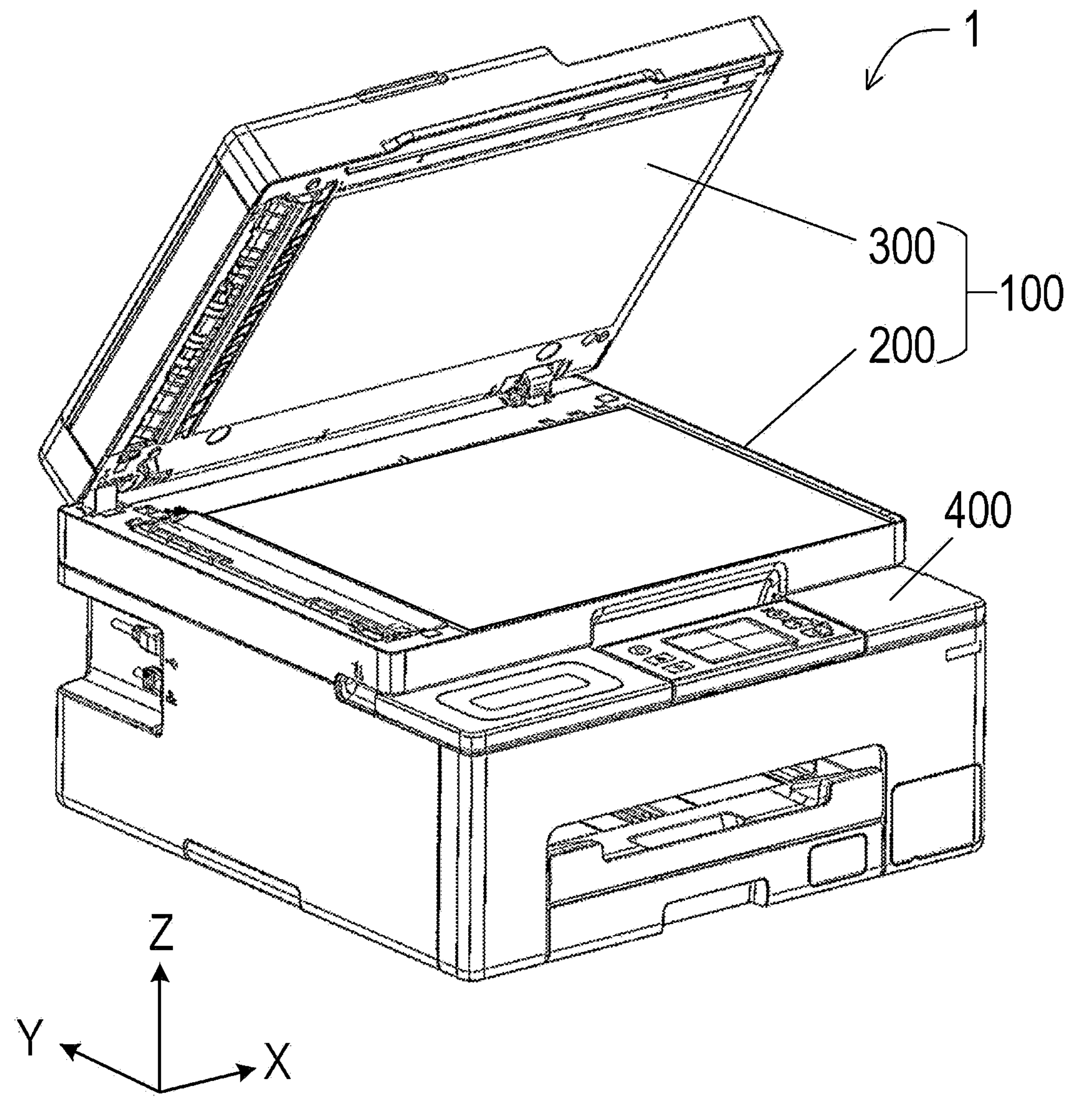
FIG. 1 is a perspective view of a multifunction apparatus according to a first embodiment.

Hereafter, a description will be given, with reference to the drawings, of embodiments (examples) of the present invention. However, the sizes, materials, shapes, their relative arrangements, or the like, of constituents described in the embodiments may be appropriately changed according to the configurations, various conditions, or the like, of apparatuses to which the invention is applied. Therefore, the sizes, materials, shapes, their relative arrangements, or the like, of the constituents described in the embodiments do not intend to limit the scope of the invention to the following embodiments.

An image reading apparatus according to the present invention is applicable to a flatbed scanner apparatus, a copying machine in which a flatbed scanner apparatus and a printing apparatus are combined, a facsimile machine, a multifunction apparatus, and the like. In particular, the present invention is suitably applied to an image reading apparatus that has a document conveyance reading system as a document reading system and includes a removable sheet conveyance guide. As an example of an image reading apparatus to which the present invention is applied, an image reading apparatus that captures a document image into a computer or the like is described below. The same reference numerals indicate the same or corresponding parts throughout the drawings. The X direction shown as appropriate in the drawings is the width direction of the image reading apparatus, the Y direction is the depth direction, and the Z direction is the height direction. In the first embodiment, the X direction, the Y direction, and the Z direction are orthogonal to each other.

First Embodiment

Image Reading Apparatus 100

FIG. 1 is an external perspective view of a multifunction apparatus 1 in which an image reading apparatus 100 according to a first embodiment of the present invention is combined with a printing apparatus 400, which is an inkjet printer. The image reading apparatus 100 is essentially configured by a scanner portion 200, which serves as an image reading portion, and an ADF portion 300, which is configured to be capable of conveying sheets such as documents. The ADF portion 300 is configured to be openable and closable with respect to the scanner portion 200 to allow a document to be placed on the scanner portion 200. FIG. 1 shows the image reading apparatus 100 with the ADF portion 300 open.

Figure 2:
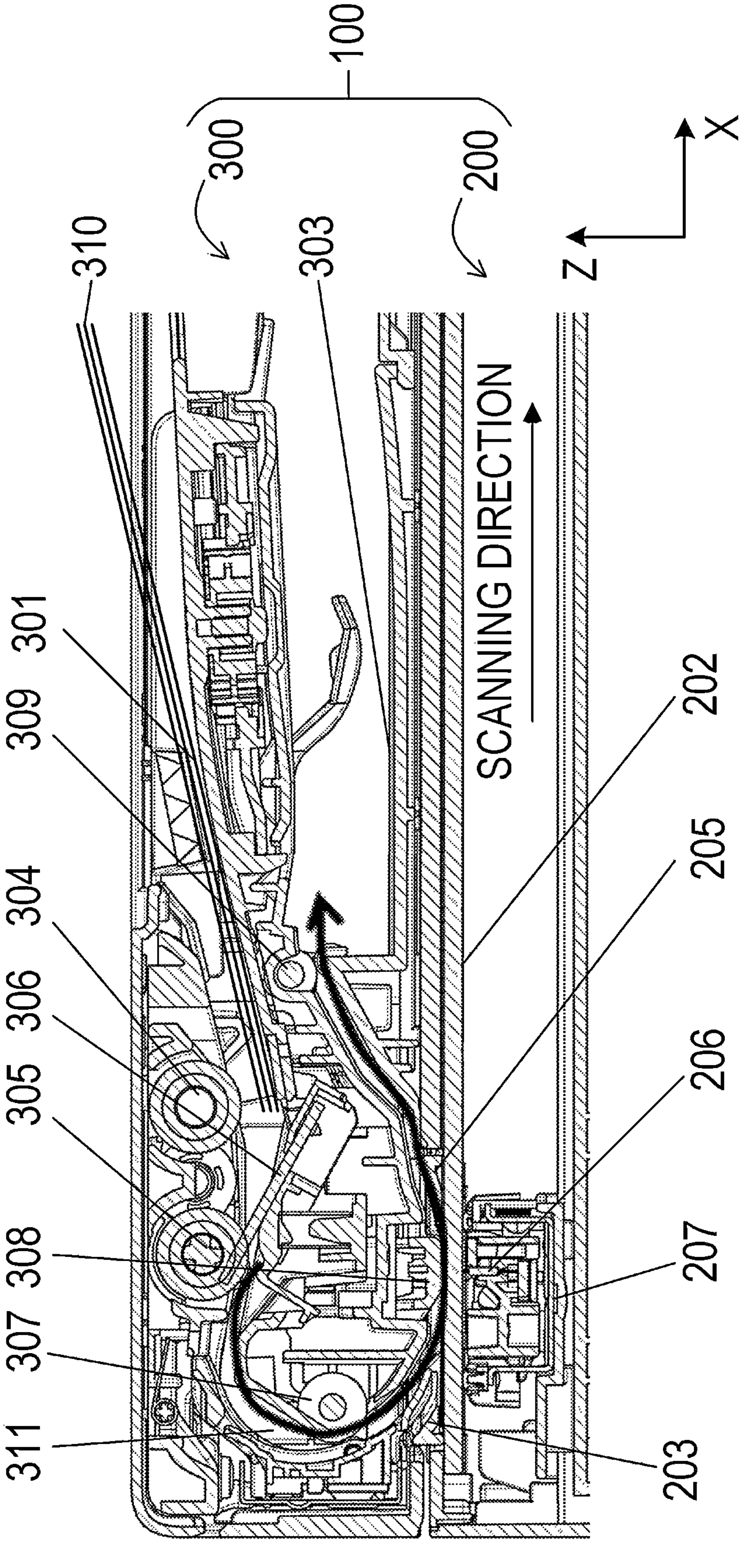
FIG. 2 is a cross-sectional view of an image reading apparatus of the first embodiment.

Referring to FIG. 2, the configuration of the ADF portion 300 of the image reading apparatus 100 is now described. FIG. 2 is a cross-sectional view of the scanner portion 200 and ADF portion 300 of the image reading apparatus 100. FIG. 2 shows a cross section of the image reading apparatus 100 taken along an X-Z plane with the ADF portion 300 closed. In FIG. 2, the solid arrow indicates the path of a document moving along a document conveyance passage 311 in the ADF portion 300. A part of the document conveyance passage 311 is formed by a part of the scanner portion 200.

The ADF portion 300 includes a document placement base 301, on which a document is placed, a document conveyance mechanism portion, which is configured to be capable of conveying a sheet-shaped document, and a document discharge portion 303. The configuration of the document conveyance mechanism portion is now described in order from the upstream side in the document conveyance direction. The document conveyance mechanism portion is a conveyance means including a sheet conveyance mechanism from a pickup roller 304 to a discharge roller 309, which will be described below.

Documents 310, which are to be automatically conveyed, are first placed on the document placement base 301 in the upper portion of the ADF portion 300. The pickup roller 304 of the document conveyance mechanism portion conveys the documents 310 placed on the document placement base 301 toward a separation roller 305. Then, the documents 310 are conveyed one by one by the separation roller 305 and a separation pad 306 to a conveyance roller 307 on the downstream side in the conveyance direction. The conveyance roller 307 then conveys the documents 310 to a conveyance guide 203 on the downstream side in the conveyance direction. The conveyance guide 203 is a guide portion that is attachable and detachable with respect to the image reading apparatus 100. When a document 310 passes along the conveyance guide 203, the document 310 is pressed by a white pressing plate 308 and brought into close contact with the conveyance guide 203. At this time, the image sensor 206 reads the document 310. The white pressing plate 308 is sized to cover the entire range of the image sensor 206 in the main scanning direction (Y direction).

After passing the conveyance guide 203, the document 310 passes a document size indication member 205, which is downstream of the conveyance guide 203 in the conveyance direction, and is discharged to a document discharge portion 303 by the discharge roller 309, which is downstream of the document size indication member 205 in the conveyance direction. The conveyance guide 203 and the document size indication member 205 are components of the scanner portion 200. The document conveyance mechanism portion, which includes various document detection sensors (not shown), is configured to be capable of detecting the passage of the leading edge and the trailing edge of a document. The detection results (outputs) of the various document detection sensors are used to control the reading timing of the image sensor 206.

The image reading apparatus 100 has two systems for reading documents, a fixed document reading system (flatbed reading) and a document conveyance reading system (ADF reading). The fixed document reading system reads a document by fixing the document on the glass base 202 of the scanner portion 200 and moving the reading unit 207 in the sub-scanning direction (X direction). The document conveyance reading system fixes the reading unit 207 to a predetermined position (ADF position) under the removable conveyance guide 203, and reads a document while conveying the document with the ADF portion 300.

The reading unit 207 of the scanner portion 200 in FIG. 2 is in a standby state at the ADF position to read a document 310 that is automatically conveyed by the ADF portion 300.

Scanner Portion 200

Figure 3A:
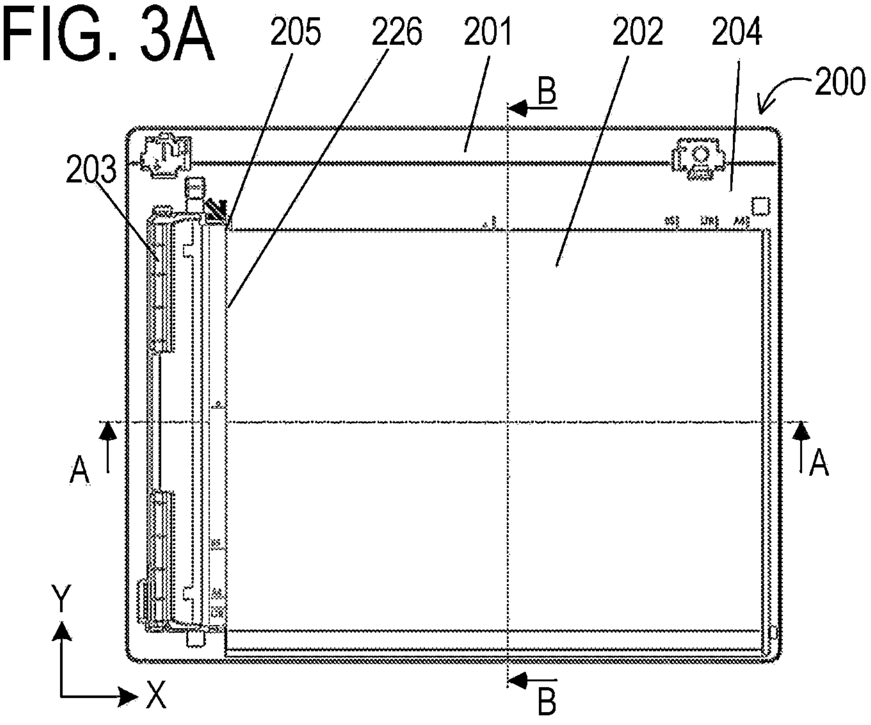
FIGS. 3A to 3D are explanatory diagrams of a scanner portion of the first embodiment.
Figure 3C:
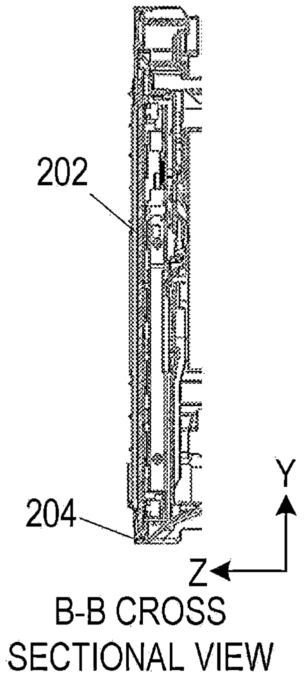
Figure 3B:
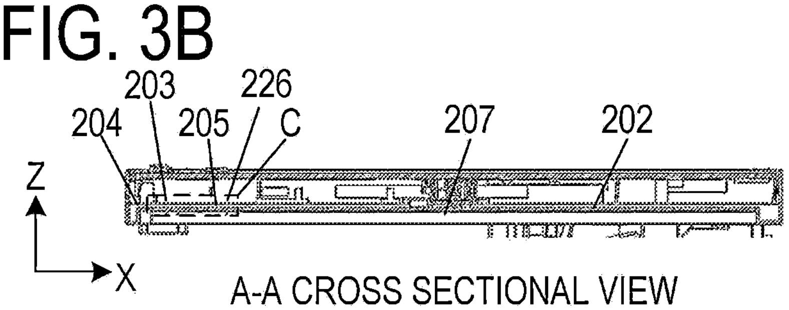
Figure 3D:
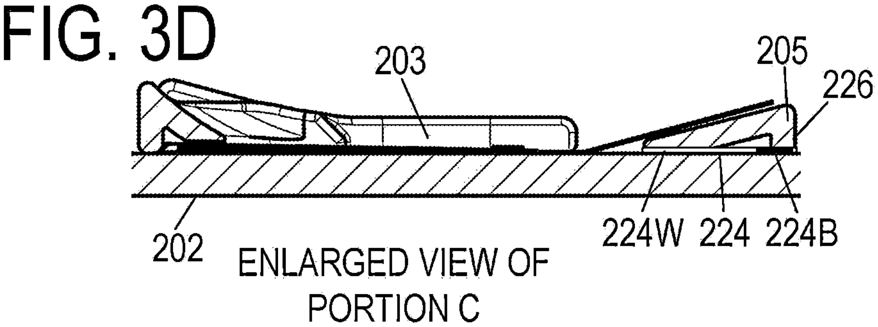

The configuration of the scanner portion 200 of the image reading apparatus 100 is now described. FIG. 3A is a top view of the scanner portion 200 with the ADF portion 300 removed from the image reading apparatus 100, and shows the entire glass frame unit 201. FIG. 3B is a cross-sectional view taken along line A-A in FIG. 3A, and is a diagram of the scanner portion 200 as viewed from the main scanning direction (Y direction). FIG. 3C is a cross-sectional view taken along line B-B in FIG. 3A, and is a diagram of the scanner portion 200 as viewed from the sub-scanning direction (X direction). FIG. 3D is an enlarged view of portion C in FIG. 3B, showing the structure around the document size indication member 205 of the glass frame unit 201.

The glass frame unit 201 includes a glass base 202, on which a document 310 is placed, a conveyance guide 203, which guides a document 310 that is automatically conveyed, and a glass frame 204, which holds the conveyance guide 203. The conveyance guide 203 is removably held by the glass frame 204. The glass frame 204 includes a document size indication member 205 and a document abutment reference 226 between the glass base 202 and the conveyance guide 203.

Figure 4:
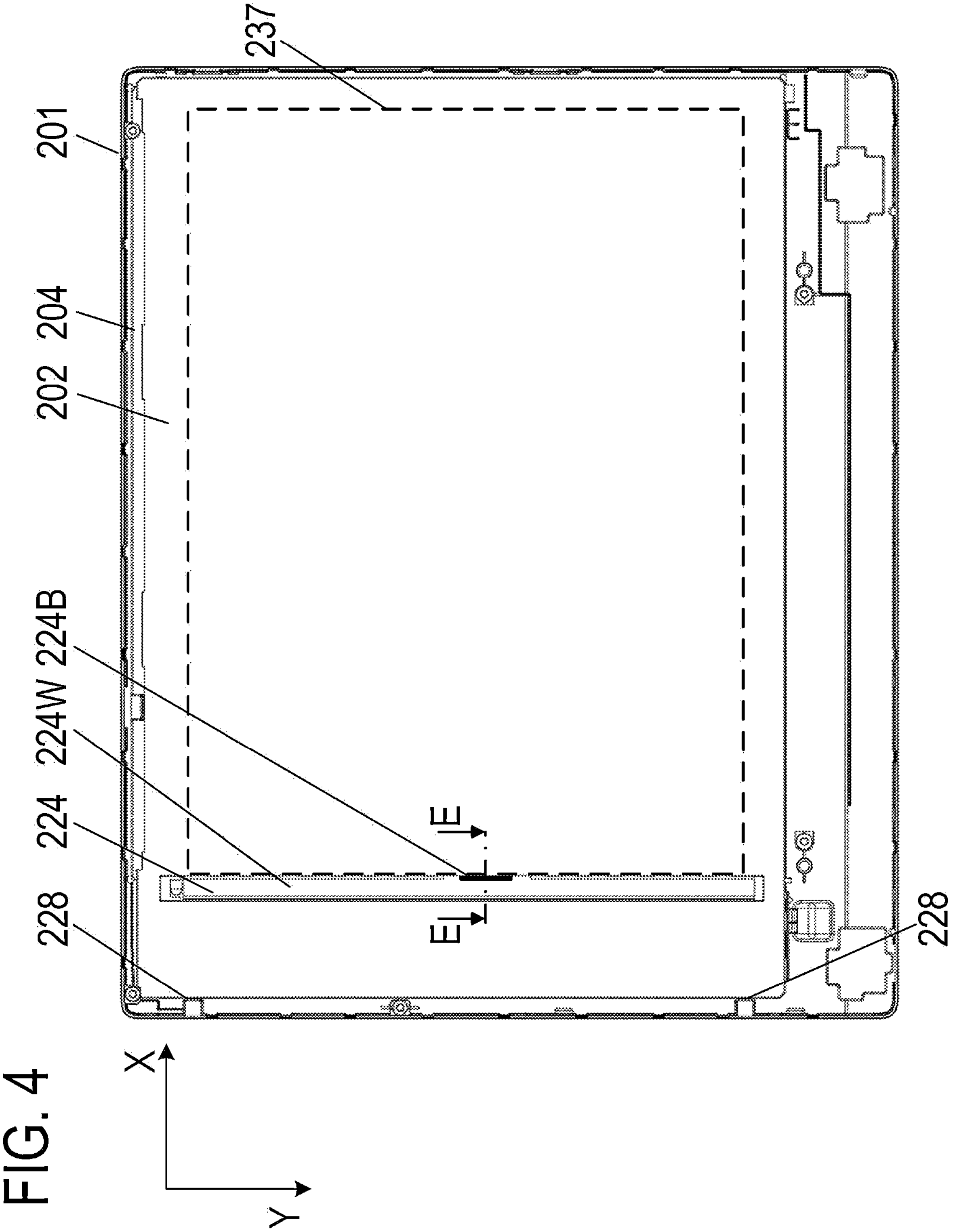
FIG. 4 is a back view of a glass frame unit of the first embodiment.

A white sheet 224 is placed on the document placement surface side of the glass base 202. In FIG. 3D, a white region 224W and a black region 224B of the white sheet 224 are shown in a simplified manner. FIG. 4 shows details of the white region 224W and the black region 224B of the white sheet 224.

FIG. 4 is a back view of the glass frame unit 201 in FIG. 3A, and is a diagram of the glass frame unit 201 as viewed from the side corresponding to the printing apparatus 400. FIG. 4 shows a part of the white sheet 224. The glass base 202 is brought into contact with two glass frame abutment portions 228 of the glass frame 204 and is thus positioned in the X direction. The white sheet 224 is placed on the back side of the glass base 202 in this diagram, which is the document placement surface. As shown in FIG. 4, the white sheet 224 is positioned in the X direction between the glass frame abutment portions 228 and a stationary document reading area 237.

The white sheet 224 integrally includes the white region 224W and the black region 224B. The white region 224W is used to perform shading correction of the image sensor 206 of the reading unit 207. The black region 224B serves as the reference position of the image sensor 206 in the sub-scanning direction shown in FIG. 6. To perform shading processing, the white sheet 224 is sized to cover the entire range of the image sensor 206 in the main scanning direction (Y direction). The position of the black region 224B in the white sheet 224 in the sub-scanning direction (X direction) is closer to the stationary document reading area 237 than the white region 224W.

Figure 5A:
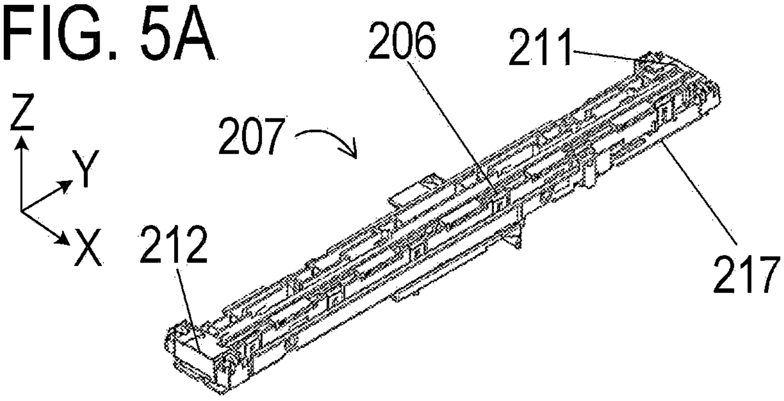
FIGS. 5A to 5C are explanatory diagrams of a reading unit of the first embodiment.
Figure 5B:
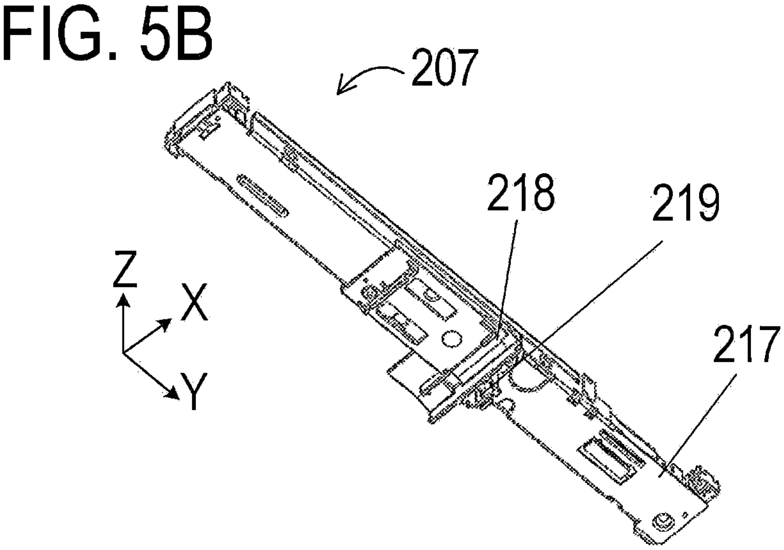
Figure 5C:
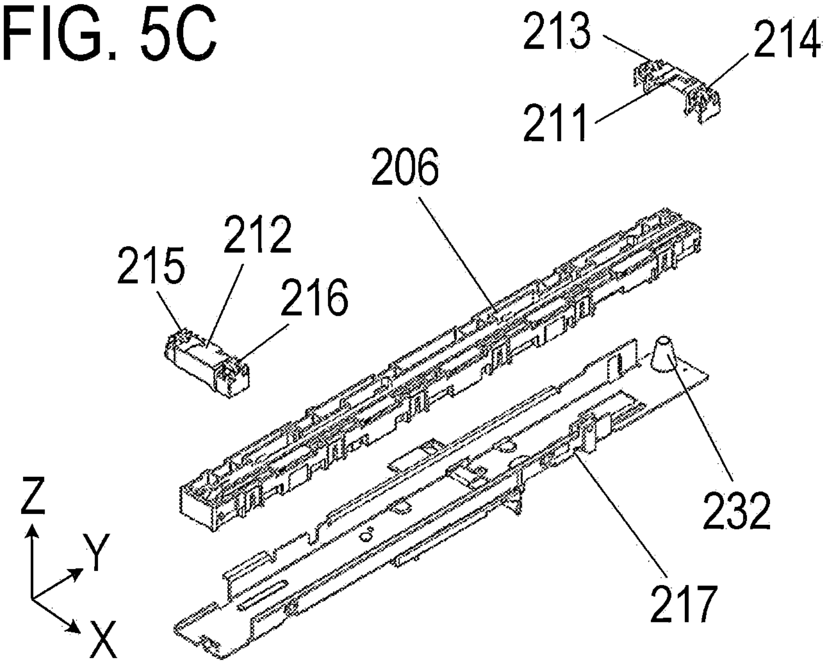

FIGS. 5A to 5C are explanatory diagrams of the reading unit 207, which reads document images. FIG. 5A is a perspective view of the reading unit 207 as viewed from the front side. FIG. 5B is a perspective view of the reading unit 207 as viewed from the back side. FIG. 5C is an exploded perspective view of the reading unit 207.

The reading unit 207 includes an image sensor 206, a sensor holder 217, a slider 218, and a drive transmission portion 219, which transmits driving force to the reading unit 207. The reading unit 207 is not limited to the above configuration, and may be a known image sensor unit, such as a contact image sensor (CIS). For example, the image sensor unit may be formed by mounting an image sensor including a housing substantially having the shape of a rectangular solid on a holding member.

A roller unit 211 is arranged at one end portion of the image sensor 206 in the main scanning direction (Y direction), and a roller unit 212 is arranged at the other end portion. The roller units 211 and 212 are provided to secure the focal distance with the document. A roller 213 is rotationally placed at one end portion of the roller unit 211 in the sub-scanning direction (X direction), and a roller 214 is rotationally placed at the other end portion. Likewise, a roller 215 is rotationally placed at one end portion of the roller unit 212 in the sub-scanning direction (X direction), and a roller 216 is rotationally placed at the other end portion. Also, a pressing spring 232 is placed between the image sensor 206 and the sensor holder 217. The pressing spring 232 constantly presses the image sensor 206 against the back surface (lower surface) of the glass base 202 located above. The rollers 213 to 216 are configured to roll on the back surface of the glass base 202 when the reading unit 207 moves in the sub-scanning direction (X direction).

Figure 6:
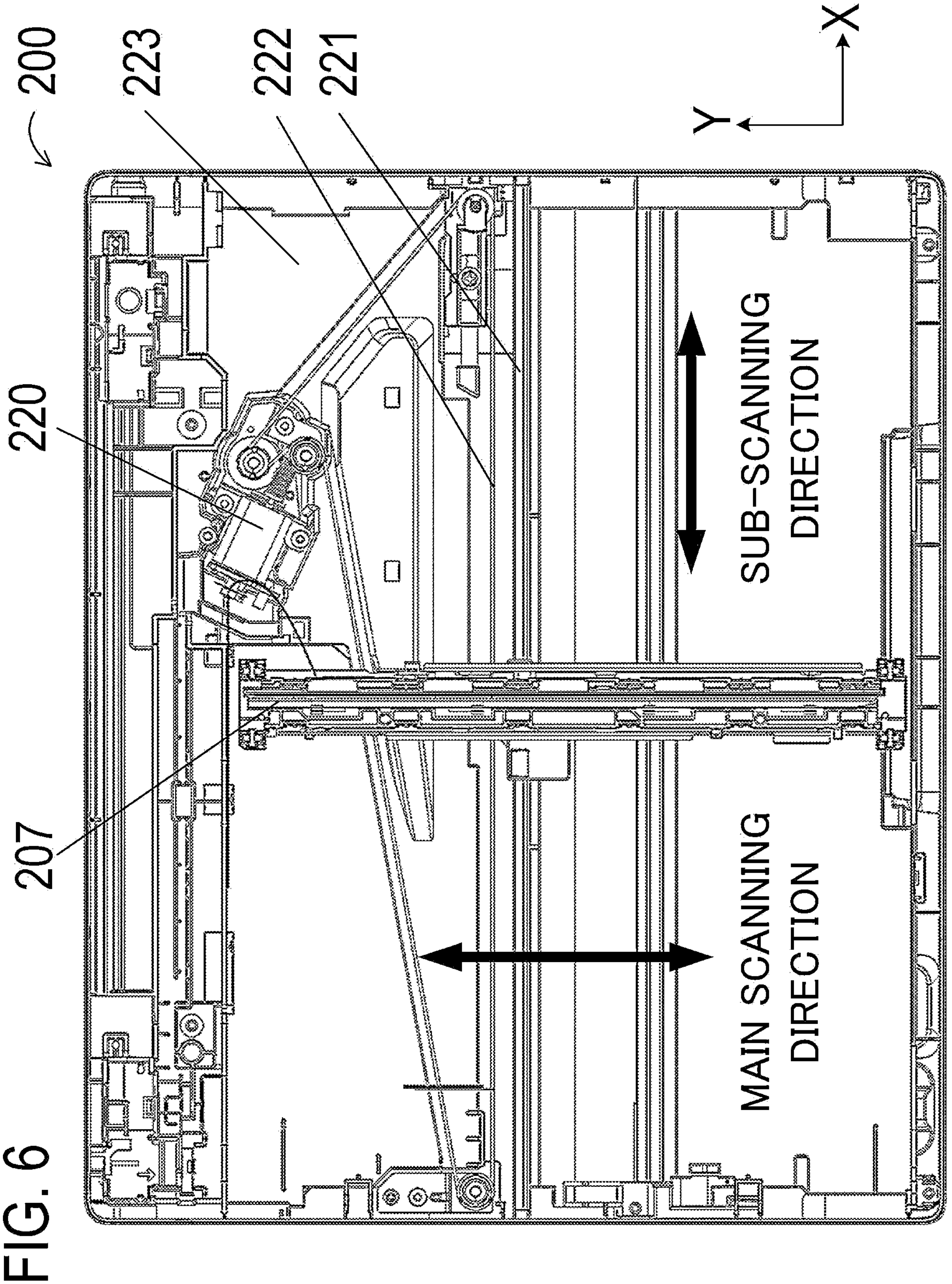
FIG. 6 is a top view showing the internal configuration of the scanner portion of the first embodiment.

FIG. 6 is a top view of the scanner portion 200 with the glass frame unit 201 removed. The scanner portion 200 includes a motor 220, a guide rail 221, a belt 222, and a base frame 223. FIG. 6 shows the internal configuration of the entire scanner portion 200, and shows the arrangement relationship between the reading unit 207 and the base frame 223.

The guide rail 221 having a longitudinal direction in the sub-scanning direction is placed in the center portion in the Y direction of the base frame 223. The slider 218 of the reading unit 207 is placed on the guide rail 221 so as to be slidable in the sub-scanning direction (X direction). The drive transmission portion 219 connects the reading unit 207 to the belt 222. When a drive input is input to the motor 220, the belt 222 moves according to the input, and the reading unit 207 reciprocates and scans along the guide rail 221. This configuration allows the reading unit 207 to move in the sub-scanning directions.

The first embodiment is of a belt-driven type in which a drive portion is placed on the base frame 223 and the driving force of the drive portion is transmitted by the belt 222, but it may be a reading unit of a self-running type, in which a drive portion is placed in the reading unit 207.

Electrical Configuration of Reading Unit 207

Figure 7:
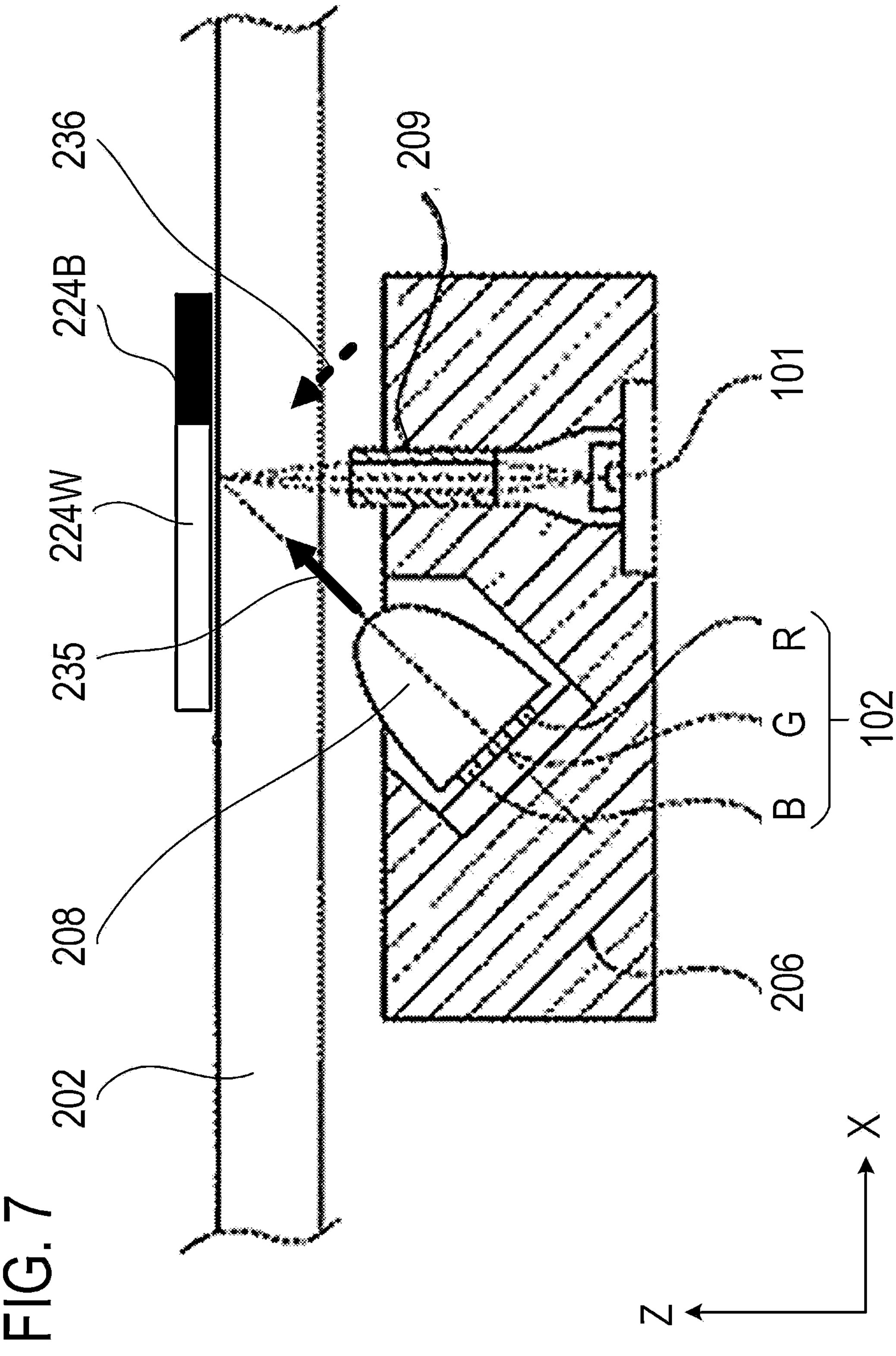
FIG. 7 is a cross-sectional view of an image sensor of the first embodiment.
Figure 8:
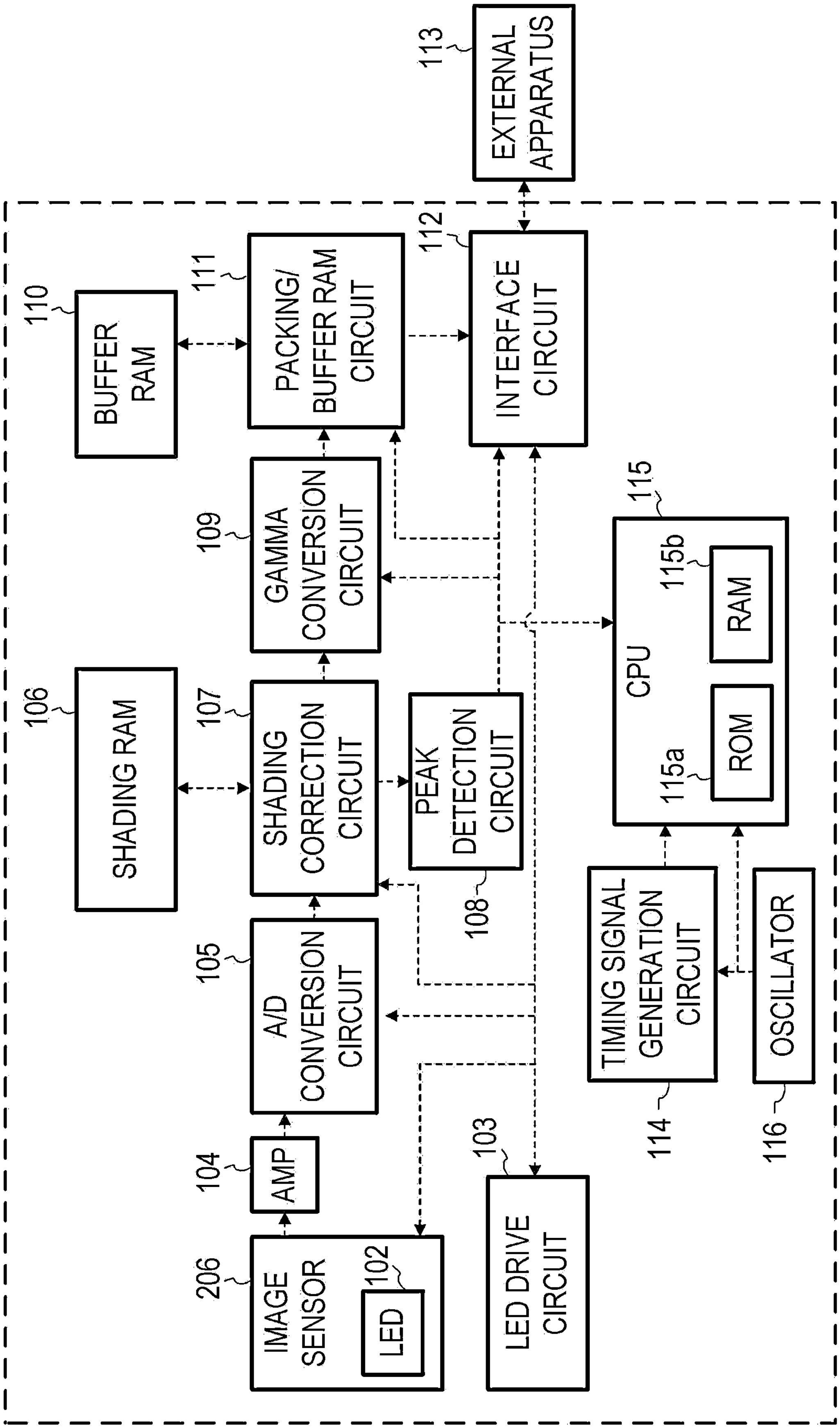
FIG. 8 is a block diagram showing the electric circuit configuration of the first embodiment.

Referring to FIGS. 7 and 8, the electrical configuration of the reading unit 207 is now described. FIG. 7 is a cross-sectional view of the image sensor 206. The image sensor 206 includes therein LEDs 102, which are light emitting elements of three colors, a rod lens array 209, and a light receiving element 101. Light applied to the document from the LEDs 102 passes through the glass base 202 and is reflected on the document surface. This reflected light passes through the rod lens array 209 and thus forms an image on the light receiving element 101. The image sensor 206 sequentially switches and lights up the LEDs 102 of three colors and reads the reflected light from the document for each color, thereby performing color separation reading. That is, the image sensor 206 is a light unit that includes the LEDs 102, which serve as a light projection portion, and the light receiving element 101, which serves as a sensor portion (light receiving portion).

FIG. 8 is a block diagram showing the configuration of the control circuit of the reading unit 207 of the present embodiment. The circuit operation of the control circuit according to the first embodiment is now described referring to FIG. 8. In FIG. 8, the image sensor 206 is a sensor in which the LEDs 102, which are light sources of three colors, are integrated. This image sensor 206 is moved under the glass base 202 in the scanning direction. At the same time, an LED drive circuit 103 switches and lights up the LEDs 102 of different colors for each line, thereby reading a color image in RGB line sequence. An AMP 104 is an amplifier that amplifies the signal output from the image sensor 206. An A/D conversion circuit 105 is an A/D converter that performs A/D conversion on the amplified output to obtain an 8-bit digital output, for example.

A shading RAM 106 stores shading correction data obtained by reading the above-described white region 224W for shading processing and performing arithmetic processing on the data. On the basis of the data of the shading RAM 106, a shading correction circuit 107 performs shading correction on the image data read by the image sensor 206.

A peak detection circuit 108 detects the peak value line by line in the read image data, and is used to detect the reference position of the reading unit 207. A gamma conversion circuit 109 performs gamma conversion of image data read according to a gamma curve preset by a host computer, which is described below. A buffer RAM 110 is a memory that temporarily stores image data in order to time the actual reading operation to the communication with the host computer.

The packing/buffer RAM circuit 111 performs packing processing according to the image output mode (e.g., binary, 4-bit multi-value, 8-bit multi-value, or 24-bit multi-value) preset by the host computer, and then performs processing of writing the data into the buffer RAM 110. The packing/buffer RAM circuit 111 also performs processing of transferring image data from the buffer RAM 110 to an interface circuit 112 to output the image data. An interface circuit (transfer means) 112 receives control signals from an external apparatus 113 and outputs image signals to the external apparatus 113. The external apparatus 113 may be a computer serving as a host apparatus of the image reading apparatus 100 according to the first embodiment, for example.

A CPU 115 may be in the form of a microcomputer, and has a ROM 115*a*, which stores process procedures, and a working RAM 115*b*. The CPU 115 is a control portion that controls each portion according to the procedures of the program stored in the ROM 115*a*. The CPU 115 controls the rotation direction, rotation speed, and rotation amount of the motor 220 by reading slit information of a code wheel, which is coaxially fixed to the motor 220 in a rotatable manner, with an encoder. That is, the CPU 115 controls the moving direction, moving speed, distance, and the like, of the reading unit 207. An oscillator 116 may be a crystal oscillator, for example. A timing signal generation circuit 114 divides the output of the oscillator 116 according to the settings of the CPU 115 and generates various timing signals that serve as operating references. The CPU 115 can selectively perform an ADF reading operation (first reading operation) that reads the image on a document while conveying the document, and a flatbed reading operation (second reading operation) that reads the image on a document on the glass base 202 while moving the reading unit 207.

In the first embodiment, the boundary between the black region 224B and the white region 224W of the white sheet 224 serves as a reference mark for image reading by the image sensor 206. The reference mark (the boundary between the black region 224B and the white region 224W) read by the image sensor 206 is detected by the encoder and stored in the RAM 115*b* in the CPU 115 as a reference position. The CPU 115 serves as a detector for detecting a reference mark and a control means for determining a reference position of the image sensor 206 from the detected reference mark and starting image reading.

The initialization movement of the image sensor 206, which is performed before reading an image when the image reading apparatus 100 is powered on, is set to be performed on the basis of the reference position determined from the reference mark detected in the sub-scanning direction. Also, the movement of the image sensor 206 after reading an image is set to be performed on the basis of the reference position read out from the above-mentioned storage means.

Operation of Reading Unit 207

Figure 9:
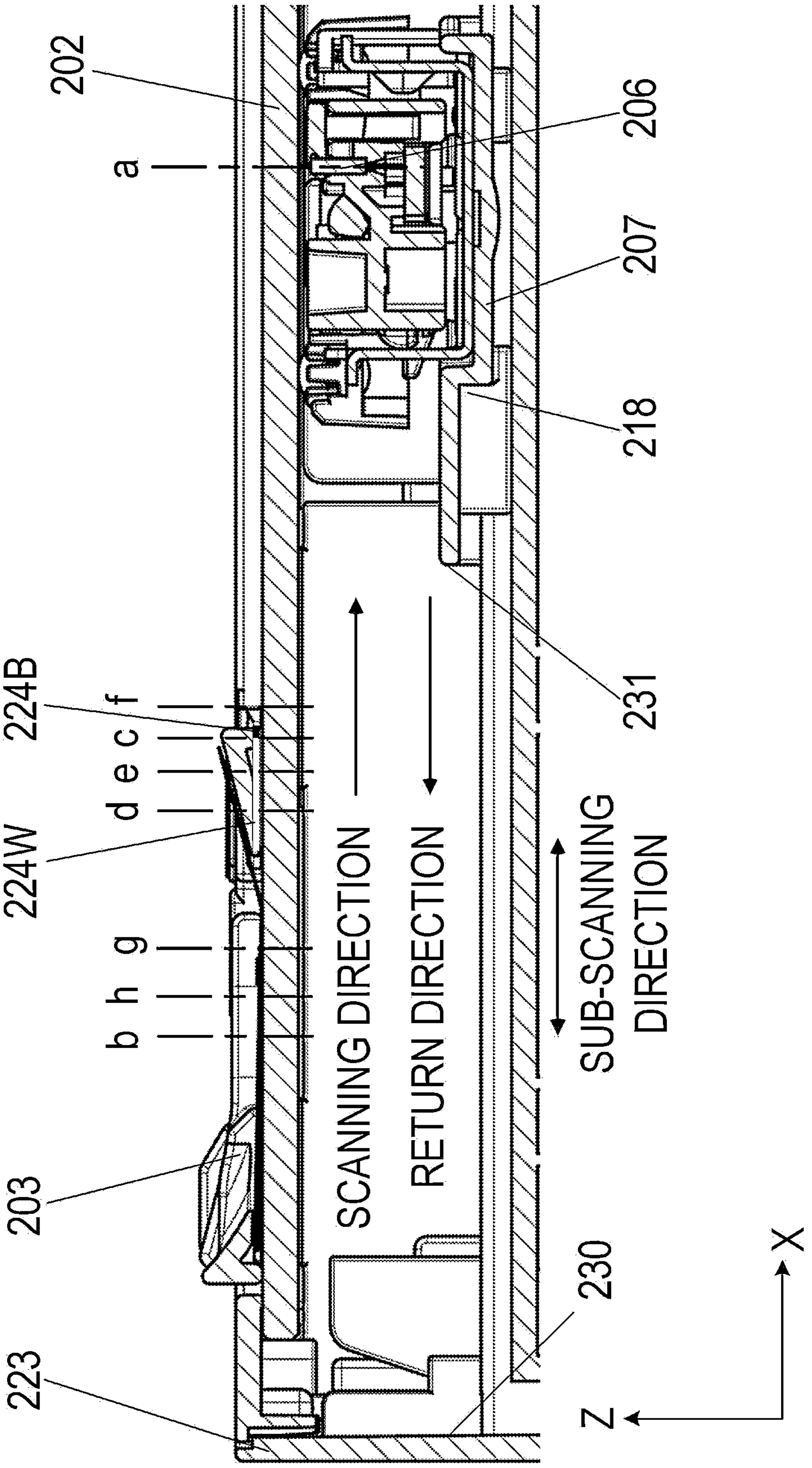
FIG. 9 is an explanatory diagram of an operation of the reading unit of the first embodiment.
Figure 10A:
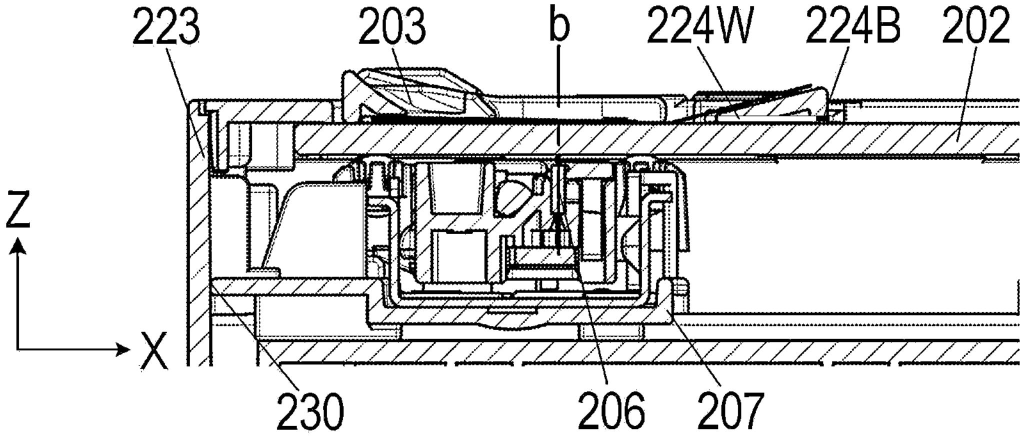
FIGS. 10A to 10C are cross-sectional views showing operating positions of the reading unit of the first embodiment.
Figure 10B:
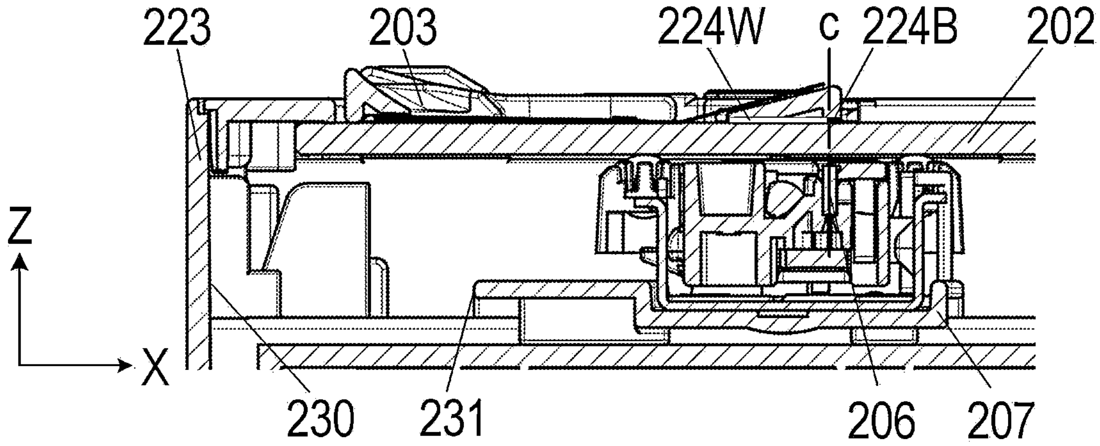
Figure 10C:
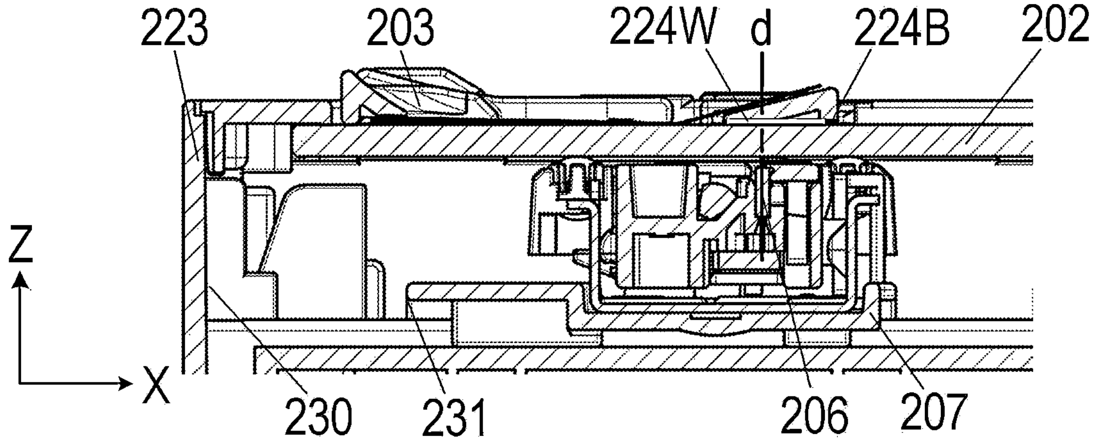
Figure 11A:
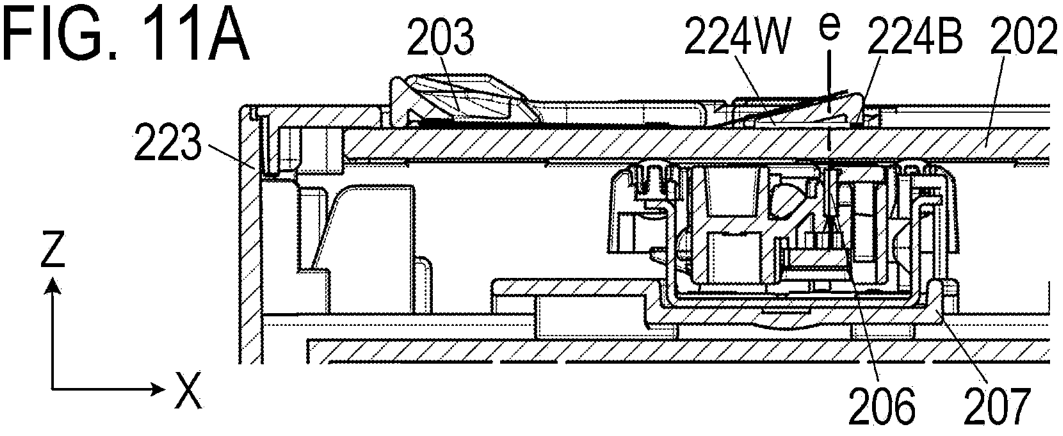
FIGS. 11A to 11D are cross-sectional views showing operating positions of the reading unit of the first embodiment.
Figure 11B:
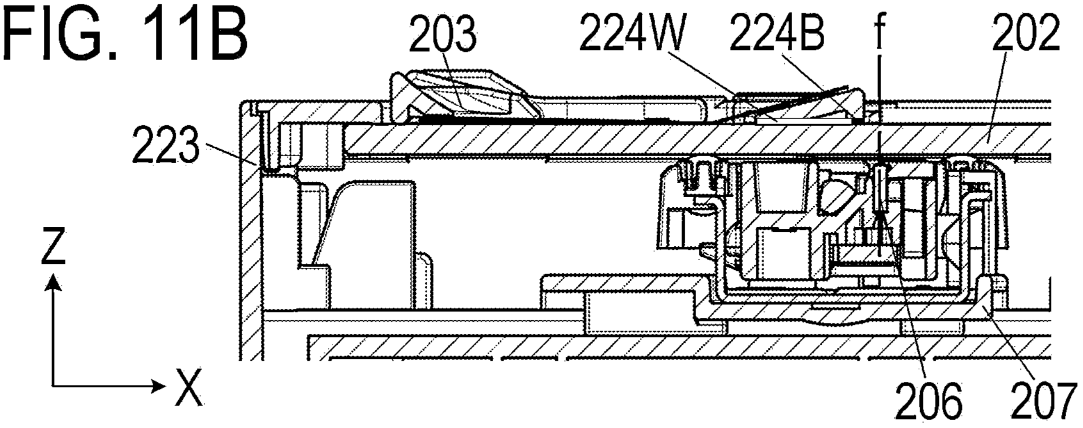
Figure 11C:
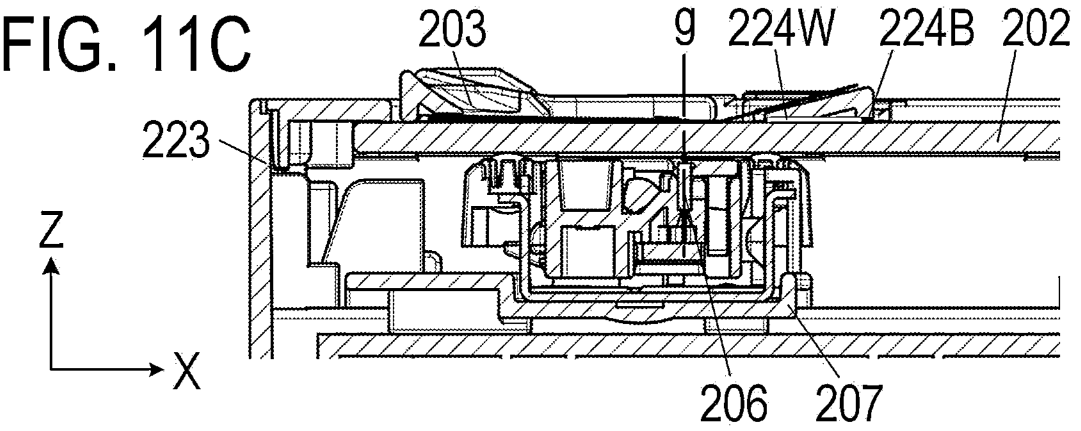
Figure 11D:
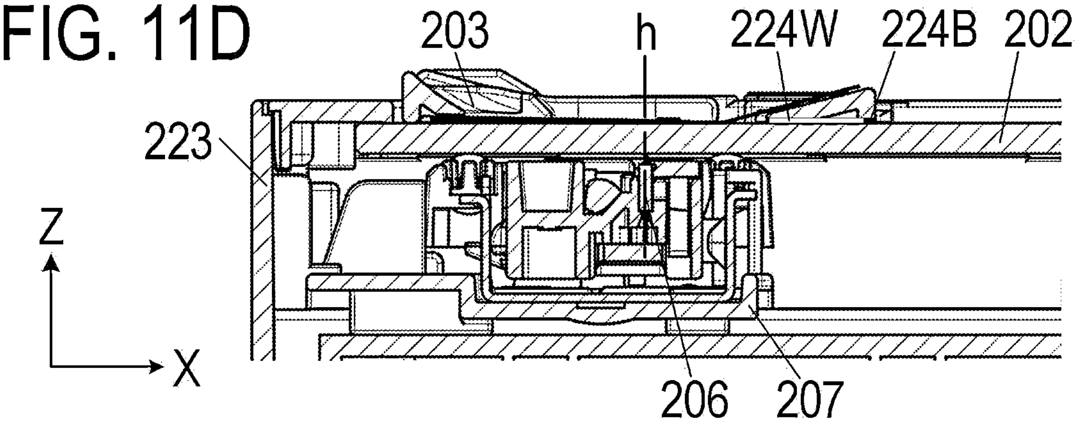
Figure 12:
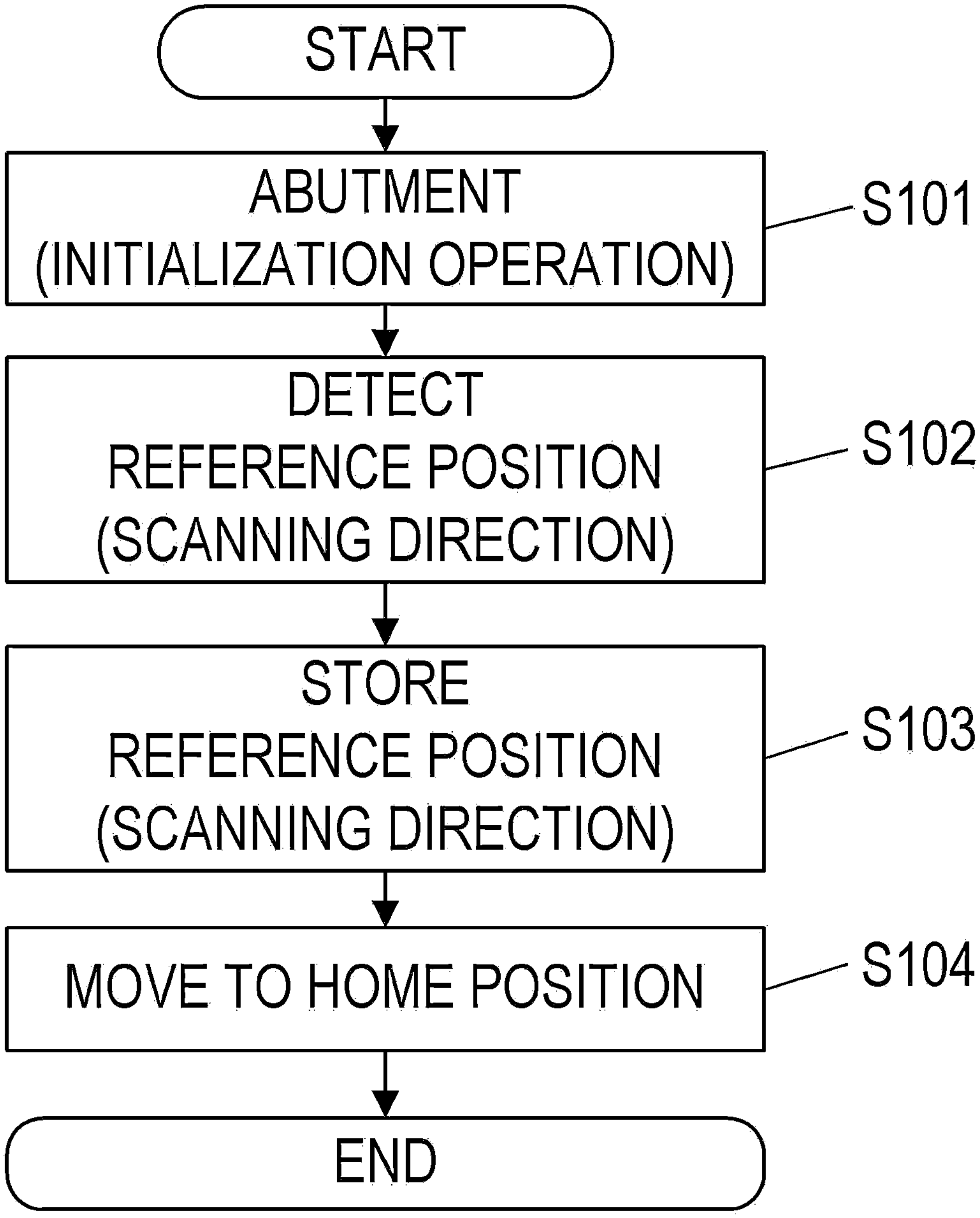
FIG. 12 is an operation sequence diagram of operation at power-on of the first embodiment.
Figure 13:
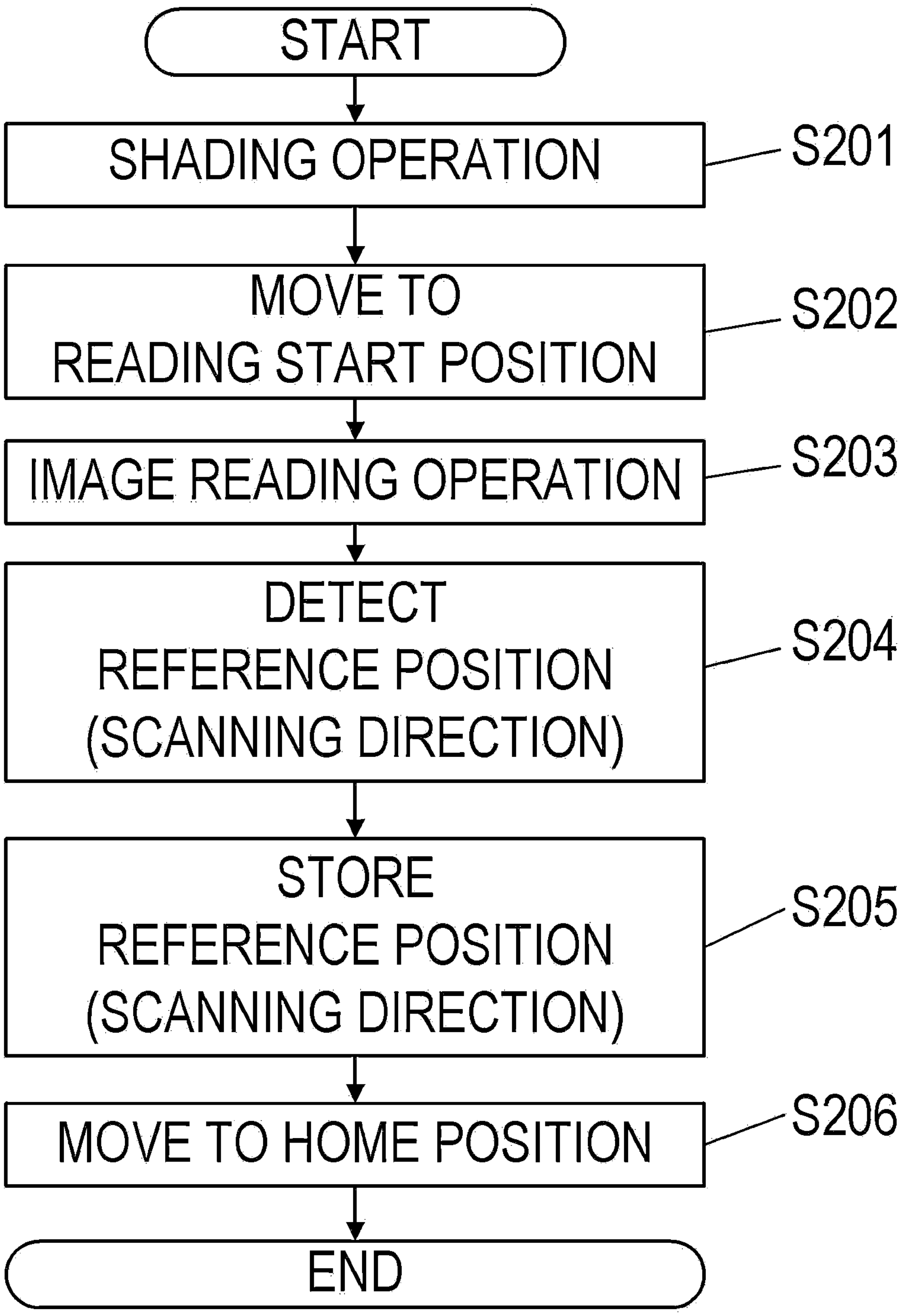
FIG. 13 is an operation sequence diagram of operation in flatbed reading of the first embodiment.
Figure 14:
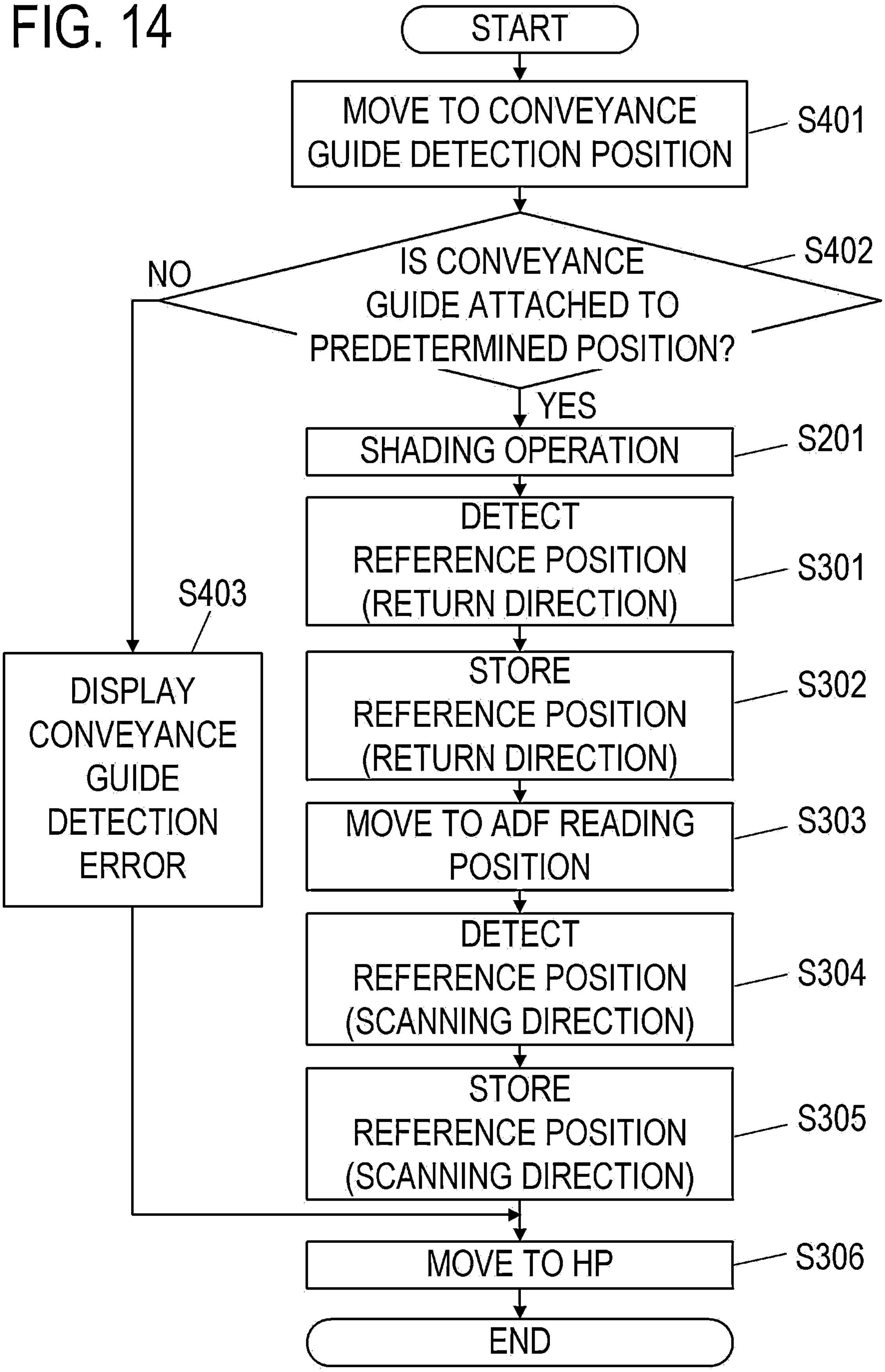
FIG. 14 is an operation sequence diagram of operation in ADF reading of the first embodiment.

Referring to FIGS. 9, 10A to 10C, 11A to 11D, FIG. 12, FIG. 13, and FIG. 14, the operation of the reading unit 207 is now described. FIG. 9 is an explanatory diagram of the operation of the reading unit 207. FIGS. 10A to 10C and FIGS. 11A to 11D are explanatory diagrams showing states in which the reading unit 207 is at predetermined operating positions. FIG. 12 is an operation sequence diagram of operation at power-on. FIG. 13 is an operation sequence diagram of operation in flatbed reading. FIG. 14 is an operation sequence diagram of operation in ADF reading.

Positions a, b, c, d, e, f, g, and h indicated by dashed lines in FIG. 9 indicate the optical center of the rod lens array 209 of the image sensor 206 in states in which the reading unit 207 is at predetermined positions. Specifically, the predetermined positions are pre-power-on position a, initialization position b, reference position c, home position d (shading start position), shading end position e, reading start position f, ADF reading position g, and conveyance guide detection position h. In FIG. 9, the white region 224W and the black region 224B are simplified in the cross-sectional view, and the actual configuration is as illustrated in FIG. 4.

The reading unit 207 before power-on is basically at the pre-power-on position as shown in FIG. 9. The sub-scanning position of the reading unit 207 in this state may be any position other than the pre-power-on position a because the following initialization operation is always performed after the power is turned on.

Operation at Power-on

Referring to the operation sequence diagram of FIG. 12, the operation of the image reading apparatus 100 at power-on is now described. The apparatus memory does not have any position information immediately after power-on. Thus, the reading unit 207 always moves in the return direction as an initialization operation. In the initialization operation, the reading unit 207 moves until the slider abutment portion 231 of the slider 218 abuts the base frame abutment portion 230 of the base frame 223 below the glass base 202 (S101).

After that, the reading unit 207 cannot move any further, resulting in an increase in the load on the motor 220, which drives the reading unit 207. This proportionally increases the current supplied to the motor 220. A threshold of the current value is set using this property of the motor 220, and it is determined that the reading unit 207 abuts the inner wall of the base frame 223 when the current value reaches the threshold. The position of the reading unit 207 at this time is the initialization position b. FIG. 10A shows a state in which the reading unit 207 is at the initialization position b.

Then, the reading unit 207 starts moving in the scanning direction to detect the reference position c, which is the boundary between the white region 224W and the black region 224B of the white sheet 224. The image sensor 206 reaches a position to read the reference mark. FIG. 10B shows a state in which the reading unit 207 is at the reference position c.

When the image sensor 206 detects the reference mark (the boundary between the white region 224W and the black region 224B), the CPU 115 sets the reference mark detection position as a first reference position c-1 on the basis of the encoder signal (S102). The first reference position c-1 detected during movement in the scanning direction in this manner is stored in the RAM 115*b* as the reference for flatbed reading (S103).

The reading unit 207 then moves from the reference position c by a specified amount in the return direction in response to an instruction from the CPU 115, and moves to the home position d (S104). In the first embodiment, this home position d is the shading start position. FIG. 10C shows a state in which the reading unit 207 is at the home position d.

In this manner, an initialization operation is performed after power-on, and the reading unit 207 detects the reference position c and moves to the home position d.

Operation in Flatbed Reading

Referring to the operation sequence diagram of FIG. 13, the operation of the image reading apparatus 100 in flatbed reading is now described. Before reading an image, the reading unit 207 performs shading processing of the image sensor 206 in response to an instruction from the CPU 115. The reading unit 207 reads the white region 224W with a predetermined reading resolution for a predetermined length while moving in the scanning direction from the home position d, which is the shading start position, and ends the shading processing (S201). The position of the reading unit 207 at this time is the shading end position e. FIG. 11A shows a state in which the reading unit 207 is at the shading end position e.

Then, the reading unit 207 moves for a specified distance from the first reference position c-1 stored in the RAM 115*b*, accelerates in the sub-scanning direction, and starts image reading from the reading start position f after reaching a stable reading speed (S202 to S203). FIG. 11B shows a state in which the reading unit 207 is at the reading start position f.

The above configuration improves the accuracy of the reading position of the image sensor 206 and reduces the variation in the image sensor operating range. After the reading operation is completed, the reading unit 207 moves in the sub-scanning direction toward the first reference position c-1.

After the movement operation is completed, reference position detection is performed again in the scanning direction (S204). Then, the first reference position c-1 is stored in the RAM 115*b* (S205), the reading unit 207 moves to the home position d (S206), and the flatbed reading operation is completed.

Operation in ADF Reading

Referring to the operation sequence diagram of FIG. 14, the operation of the image reading apparatus 100 in ADF reading is now described. When ADF reading is instructed by the CPU 115, the reading unit 207 moves from the home position d to the conveyance guide detection position h (S401). FIG. 11D shows a state in which the reading unit 207 is at the conveyance guide detection position h.

The reading unit 207 stops after moving to the conveyance guide detection position h, and, at this position, the image sensor 206 reads the entire range in the longitudinal direction of the image sensor 206. Using the detection pattern output by this reading, it is detected whether the conveyance guide 203 is attached to a predetermined position of the image reading apparatus 100. Then, on the basis of the result of this detection, the control portion determines whether to perform a document reading operation. A method for detecting the attachment state of the conveyance guide 203 on the basis of a detection pattern that is an output result of the image sensor 206 will be described in detail below.

If it is determined that the conveyance guide 203 is not attached to the predetermined position of the image reading apparatus 100 (NO at S402), a conveyance guide detection error is displayed on the display screen (S403). Then, the control portion determines to stop the reading operation, and the reading unit 207 moves to the home position d and ends the operation (S306).

If it is determined that the conveyance guide 203 is attached to the predetermined position of the image reading apparatus 100 (YES at S402), the control portion determines to continue performing the reading operation. The reading unit 207 then performs shading processing of the image sensor 206 following an instruction from the CPU 115 (S201).

After the shading processing, the reading unit 207 moves in the scanning direction passing the reference position c, and then moves in the return direction to detect the reference mark (the boundary between the white region 224W and the black region 224B) with the image sensor 206 (S301). Then, the CPU 115 sets the reference mark detection position as a second reference position c-2 on the basis of the encoder signal. The second reference position c-2 obtained in the movement in the return direction is stored in the RAM 115*b* as a reference for ADF reading (S302).

The reading unit 207 moves from the second reference position c-2 for a specified amount in the return direction and stops at the ADF reading position g (S303). FIG. 11C shows a state in which the reading unit 207 is at the ADF reading position g.

The above configuration uses the second reference position c-2 when moving in the return direction. This improves the positional accuracy during movement in the return direction, reduces the variation in the image sensor operating range, and improves the accuracy in ADF reading.

When the ADF reading is completed, the reading unit 207 moves in the scanning direction and detects the first reference position c-1 (S304). The first reference position c-1 is stored in the RAM 115*b* (S305), and the reading unit 207 moves to the home position d (S306).

By using the first reference position c-1 in flatbed reading and using the second reference position c-2 in ADF reading as in the above configuration, the reading unit 207 can be moved accurately to a desired position without being affected by the backlash of the drive train. As a result, both reading operations can achieve accurate reading.

The operation is now described that is performed when flatbed reading and ADF reading are performed multiple times. When flatbed reading is performed after flatbed reading, the sequence operation of FIG. 13 is performed, and then the sequence operation of FIG. 13 is performed again. When ADF reading is performed after flatbed reading, the sequence operation of FIG. 13 is performed, and then the sequence operation of FIG. 14 is performed. When flatbed reading is performed after ADF reading, the sequence operation of FIG. 14 is performed, and then the sequence operation of FIG. 13 is performed. When ADF reading is performed after ADF reading, the sequence operation of FIG. 14 is performed, and then the sequence operation of FIG. 14 is performed again. In this process, the first reference position c-1 and the second reference position c-2 stored in the RAM 115*b* are overwritten each time.

Relationship Between White Sheet 224 and Illumination Direction of Image Sensor 206

The relationship between the white region 224W and black region 224B of the white sheet 224 and the illumination direction of the image sensor 206 is now described.

Figure 15:
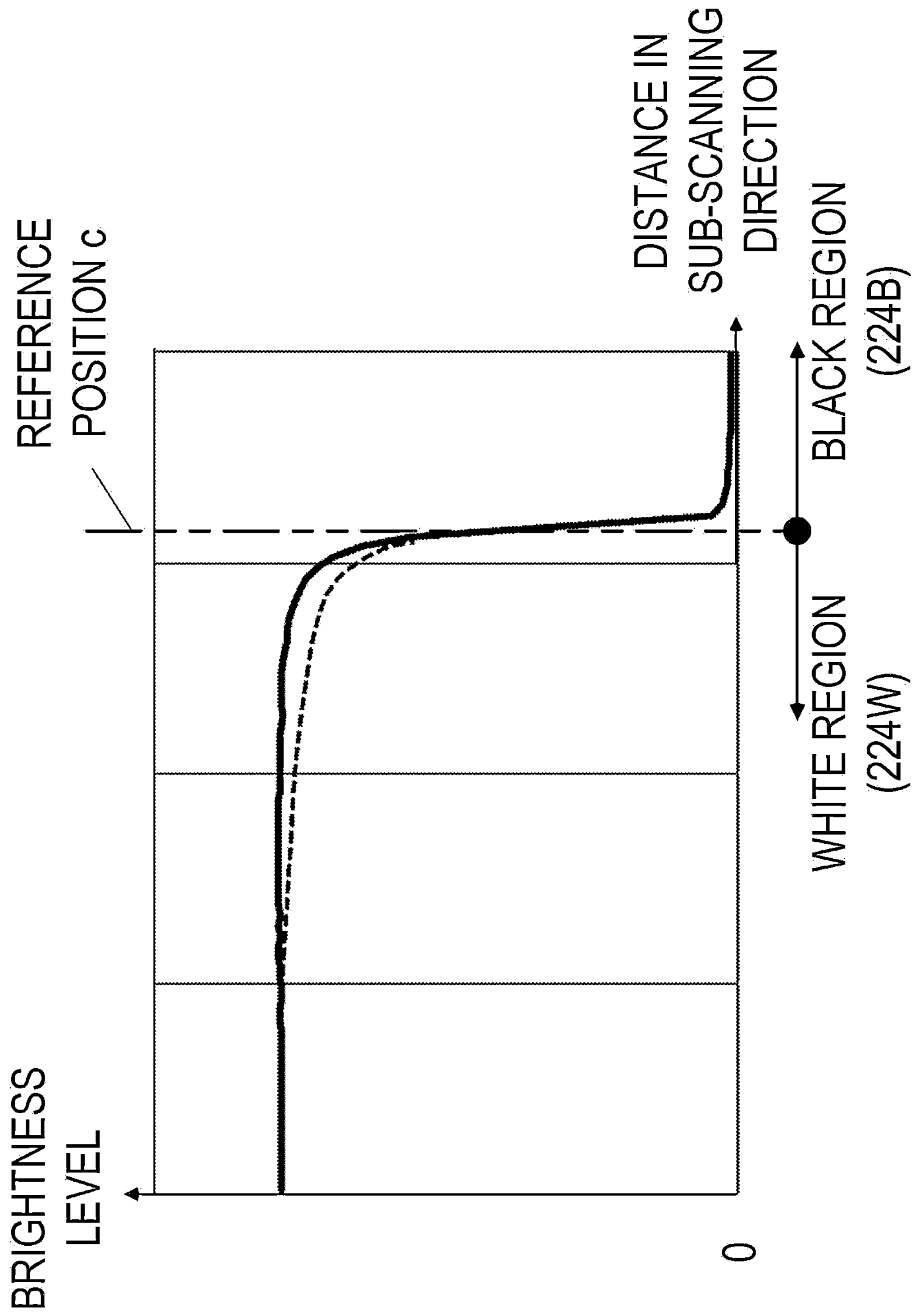
FIG. 15 is a distribution diagram of the brightness level of an image obtained in white sheet reading of the first embodiment.

FIG. 15 is a graph of the brightness level of the image read by the image sensor 206 from the white sheet 224. FIG. 15 shows the distribution of brightness levels of the image in the sub-scanning direction corresponding to the E-E cross section in FIG. 4. The vertical axis of the graph in FIG. 15 indicates the brightness level, and the horizontal axis indicates the distance in the sub-scanning direction.

In FIG. 15, the solid line graph shows the brightness level obtained in a situation where light is applied in the direction of the solid arrow 235 in FIG. 7, and the broken line graph shows the brightness level obtained in a situation where light is applied in the direction of the broken line arrow 236 in FIG. 7. In FIG. 7, the light guide 208 that emits light in the direction of the solid arrow 235 is located on the side of the rod lens array 209 corresponding to the white region 224W in the sub-scanning direction. The light illumination direction is from the side corresponding to the white region 224W to the side corresponding to the black region 224B.

In the first embodiment, the light is applied from the side corresponding to the white region 224W toward the side corresponding to the black region 224B in the direction of the solid arrow 235 shown in FIG. 7, so that it is not affected by the reflection of black. This configuration can minimize the width of the white sheet 224 in the sub-scanning direction without reducing shading accuracy, thereby achieving both improvement in image quality and downsizing of the apparatus.

Conveyance Guide Configuration and Attachment State Detection Operation

The detailed configuration of the conveyance guide 203 and an operation of detecting the attachment state of the conveyance guide 203 in ADF reading are now described.

Figure 16A:
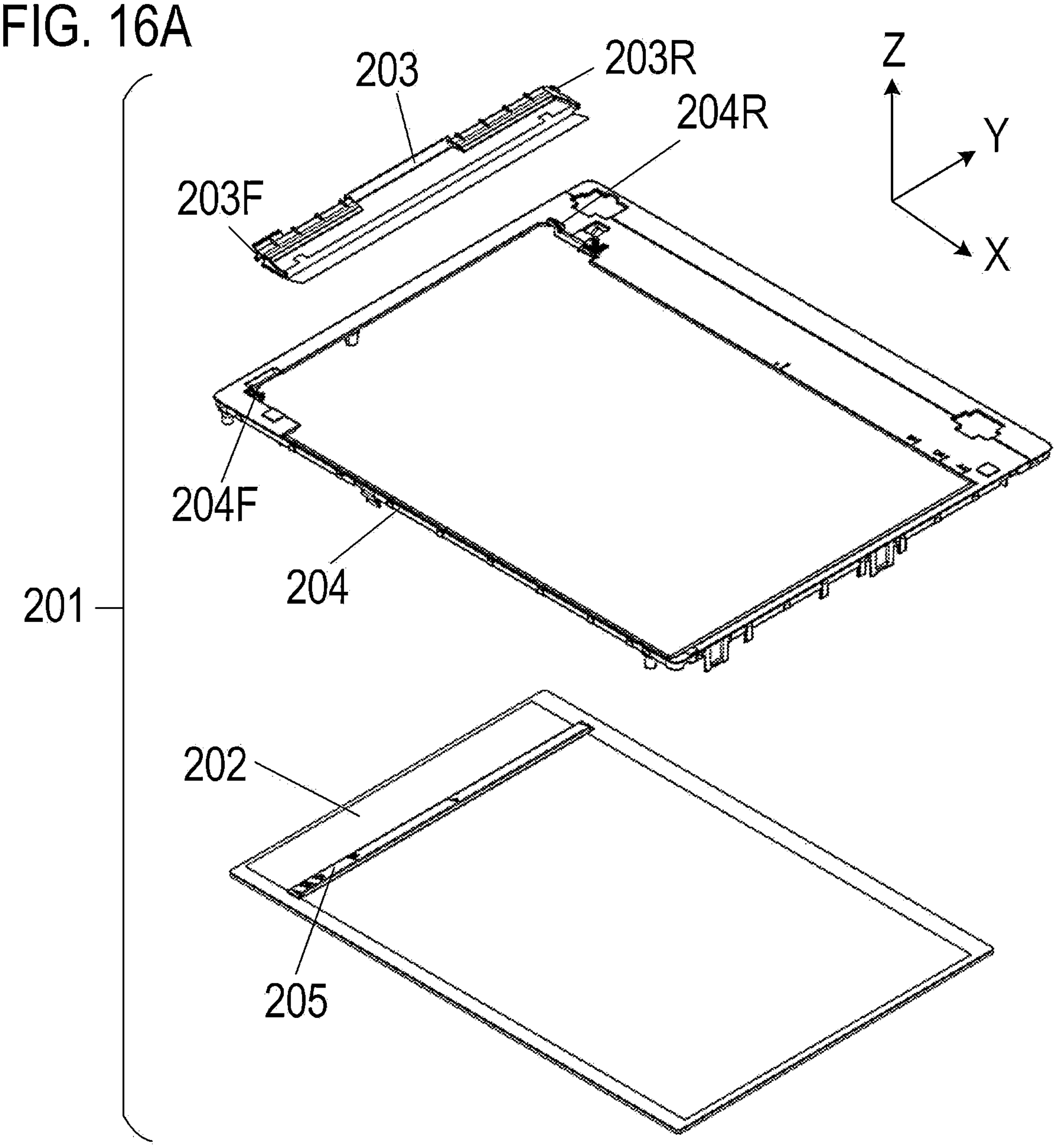
FIGS. 16A to 16C are explanatory diagrams of the glass frame unit of the first embodiment.
Figure 16B:
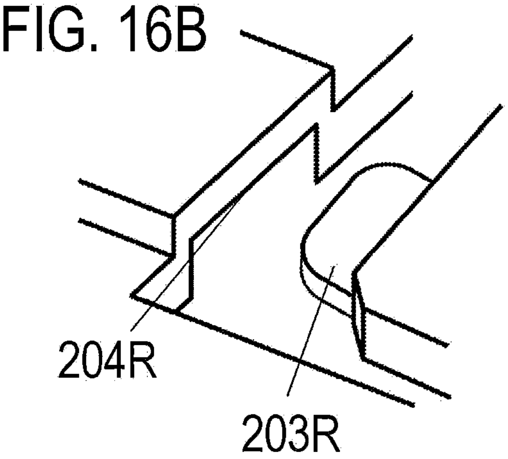
Figure 16C:
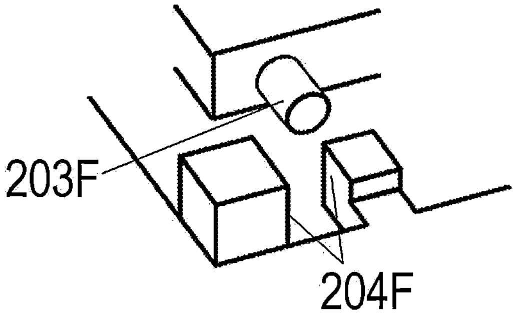

FIGS. 16A to 16C are explanatory diagrams of the glass frame unit 201 including the glass base 202, the conveyance guide 203, the glass frame 204, and the document size indication member 205. FIG. 16A is an exploded perspective view of the glass frame unit 201. FIG. 16B is an explanatory diagram of an engagement configuration provided at end portions of the conveyance guide 203 and the glass frame 204. FIG. 16C is an explanatory diagram of an engagement configuration provided at the other end portions of the conveyance guide 203 and the glass frame 204.

In assembling these members, the document size indication member 205 is first attached to the glass base 202. The integrated glass base 202 and document size indication member 205 are attached to the glass frame 204. Then, the conveyance guide 203 is attached to the glass frame 204 and placed on the upper surface of the glass base 202.

The conveyance guide 203 includes engaging portions 203F and 203R, which engage with the glass frame 204. The glass frame 204 includes an engaged portion 204F corresponding to the engaging portion 203F and an engaged portion 204R corresponding to the engaging portion 203R. As shown in FIG. 16B, the engaging portion 203R is a protruding portion protruding in the main scanning direction (Y direction), and the engaged portion 204R is shaped as a hole corresponding to the engaging portion 203R. As shown in FIG. 16C, the engaging portion 203F is a protruding portion protruding toward the side opposite from the engaging portion 203R, and the engaged portion 204F has a groove shape corresponding to the engaging portion 203F.

After the engaging portion 203R is inserted into the engaged portion 204R, the engaging portion 203F is fitted into the engaged portion 204F, so that the conveyance guide 203 engages with the glass frame 204. With this configuration, the conveyance guide 203 is attached to the predetermined position of the image reading apparatus 100. The engagement configuration between the conveyance guide 203 and the glass frame 204 is not limited to the above configuration, and other known engagement configurations may be adopted as appropriate.

Figure 17A:
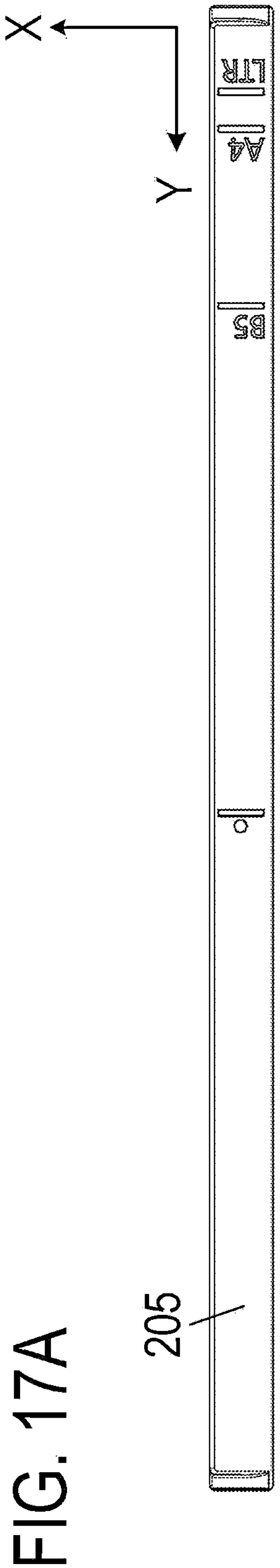
FIGS. 17A and 17B are explanatory diagrams of a document size indication member of the first embodiment.
Figure 17B:
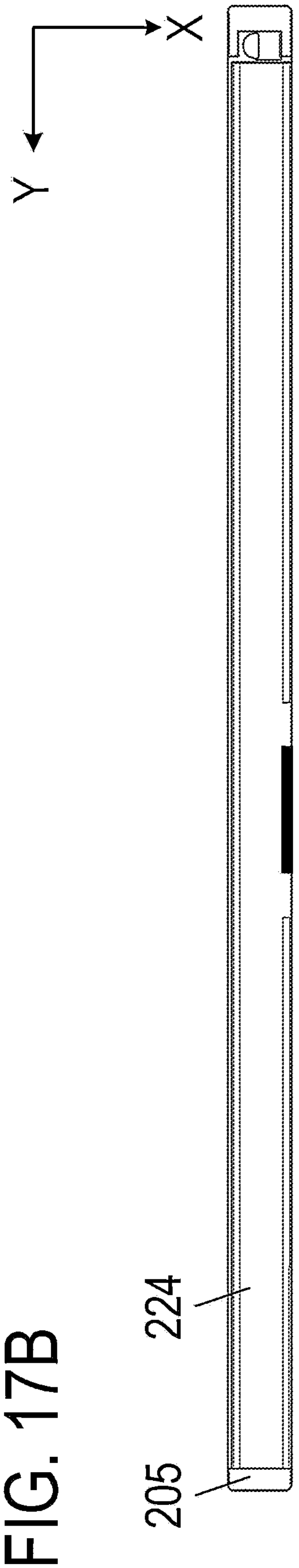

FIG. 17A is a top view of the document size indication member 205, and FIG. 17B is a bottom view of the document size indication member 205. The white sheet 224 is attached to the lower side of the document size indication member 205. In flatbed reading, the user uses the document size indication member 205 as an indicator and places a document at an appropriate position on the glass base 202 according to the size of the document, so that the image on the document is appropriately read.

Figure 18A:
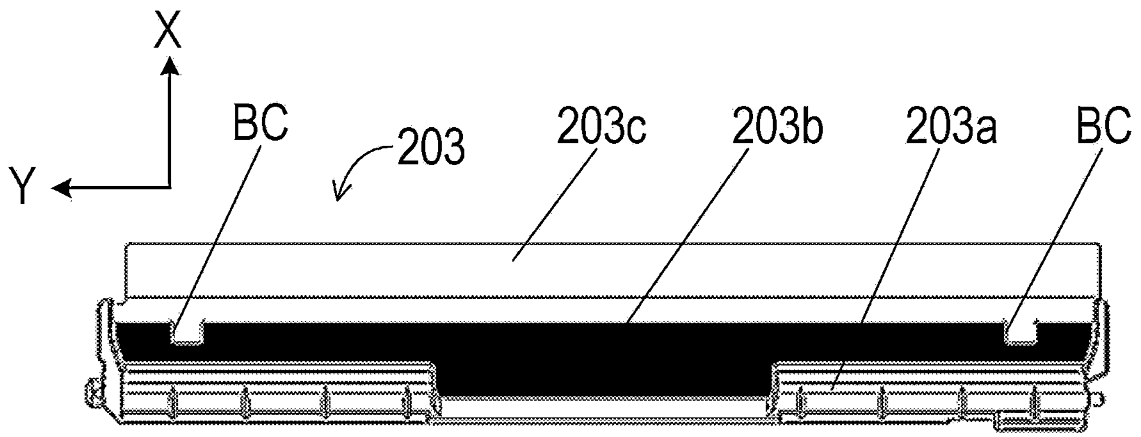
FIGS. 18A and 18B are a top view and an exploded view of a removable conveyance guide of the first embodiment.
Figure 18B:
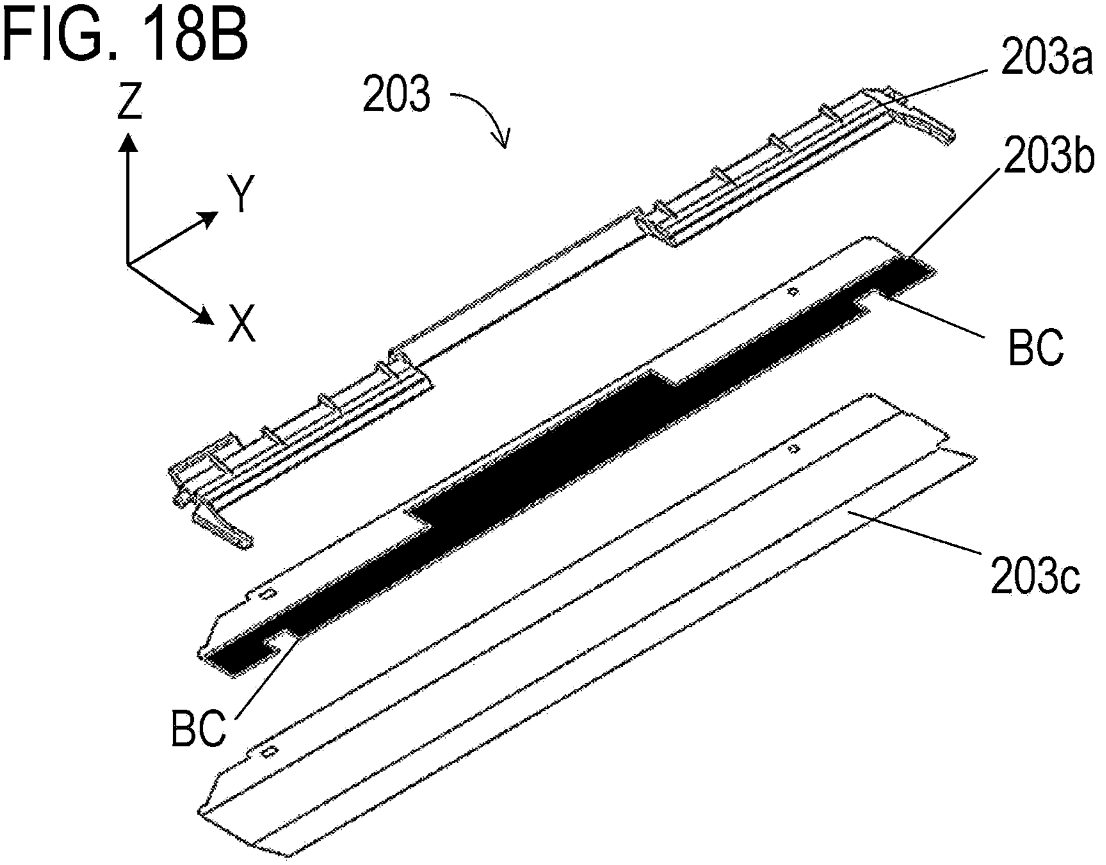

FIG. 18A is a top view of the conveyance guide 203, and FIG. 18B is an exploded view of the conveyance guide 203. The conveyance guide 203 is a guide unit including a Mylar sheet holding member 203*a*, a black Mylar sheet 203*b*, and a transparent Mylar sheet 203*c*.

The Mylar sheet holding member 203*a* guides the conveyed document with a guide surface and ribs, and also holds the black Mylar sheet 203*b* and the transparent Mylar sheet 203*c*. The black Mylar sheet 203*b* is a sheet-shaped member that hardly transmits light. Two cutout portions BC are formed at different positions in the main scanning direction (Y direction) of the black Mylar sheet 203*b*. The cutout portions BC allow light to pass. The black Mylar sheet 203*b* is provided to detect the attachment state of the conveyance guide 203. The transparent Mylar sheet 203*c* is a sheet-shaped member that transmits light. The transparent Mylar sheet 203*c* guides the conveyed document on the downstream side (document reading portion) of the Mylar sheet holding member 203*a* in the conveyance direction. That is, the conveyance guide 203 includes a light-transmitting portion formed by the transparent Mylar sheet 203*c* and a non-light-transmitting portion formed by the black Mylar sheet 203*b*. In document reading operation, the image sensor 206 reads the document through the transparent Mylar sheet 203*c*, which is the light-transmitting portion.

Figure 19A:
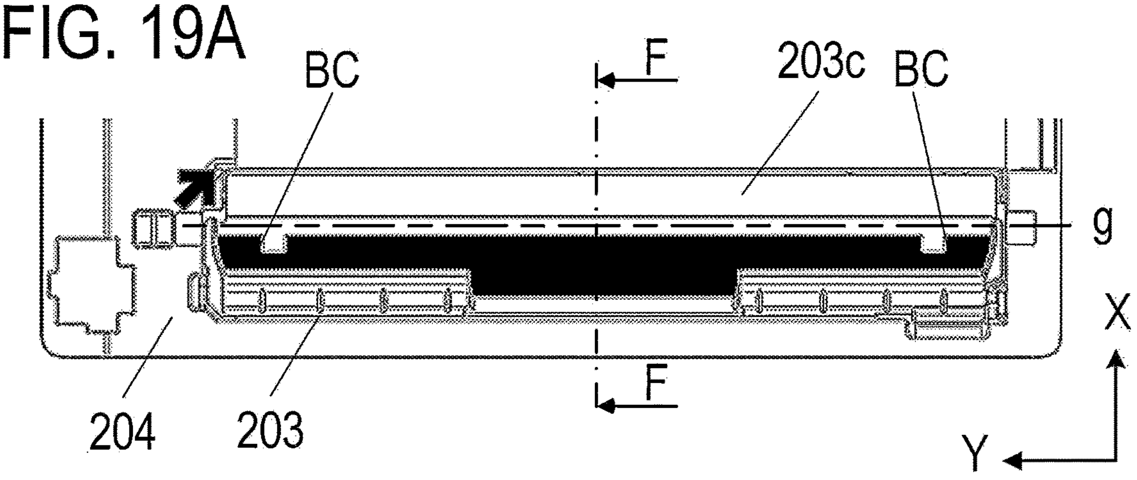
FIGS. 19A and 19B are diagrams showing the positional relationship between the reading unit and the conveyance guide of the first embodiment.
Figure 19B:
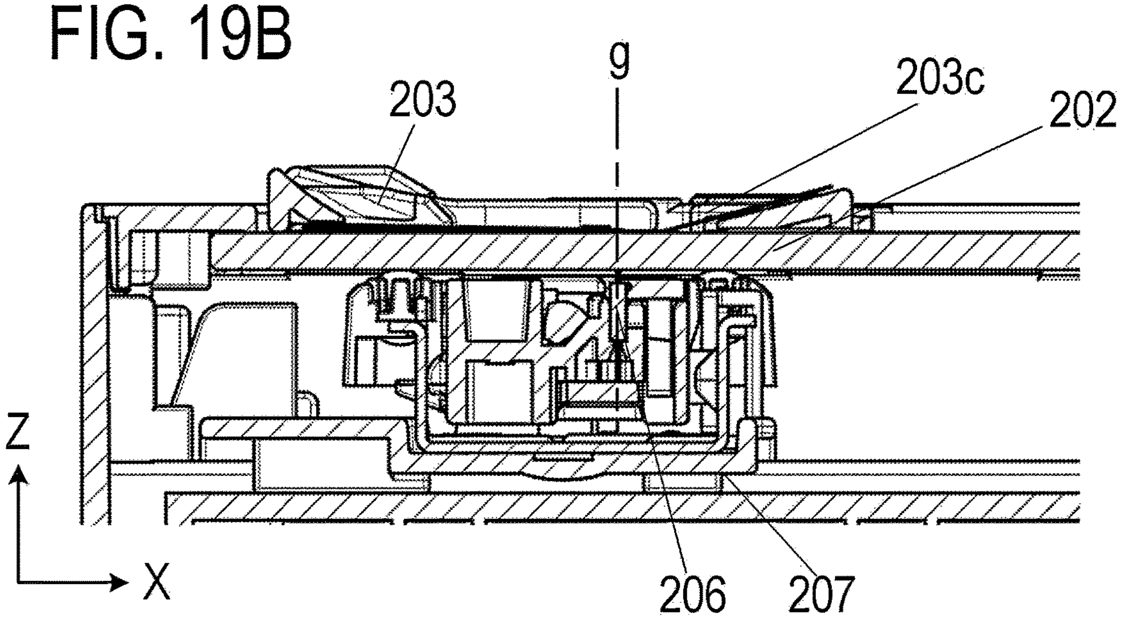

FIGS. 19A and 19B are diagrams showing the positional relationship between the reading unit 207 and the conveyance guide 203 in ADF reading. FIG. 19A is a top view of a state in which the conveyance guide 203 is attached to the glass frame 204. FIG. 19B is a cross-sectional view taken along line F-F in FIG. 19A, and is a diagram of the reading unit 207 and the conveyance guide 203 as viewed in the main scanning direction (Y direction). In ADF reading, the reading unit 207 performs the reading operation at the ADF reading position g. The ADF reading position g is a position directly below the transparent Mylar sheet 203*c*, and is a position that is not aligned with the black Mylar sheet 203*b* in the vertical direction. The reading unit 207 reads the document through the glass base 202 and the transparent Mylar sheet 203*c* with the image sensor 206.

Figure 20A:
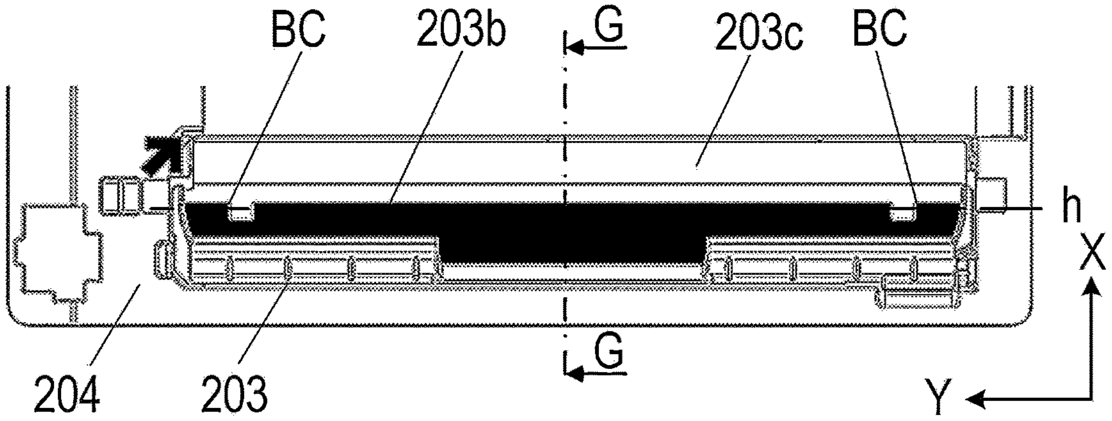
FIGS. 20A and 20B are diagrams showing the positional relationship between the reading unit and the conveyance guide of the first embodiment.
Figure 20B:
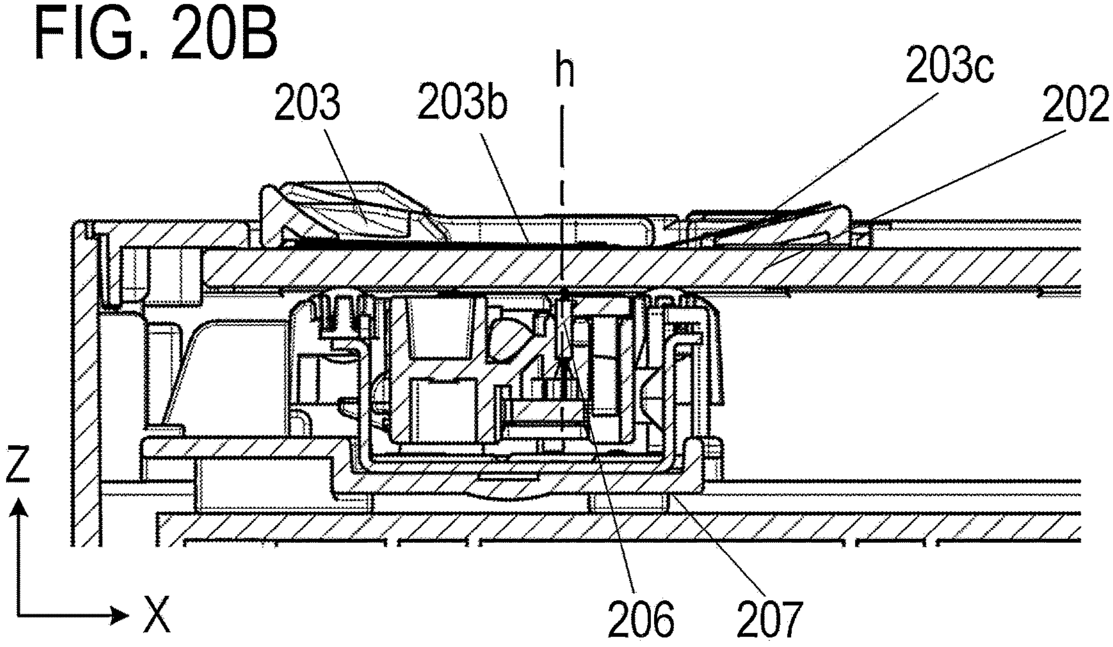

FIGS. 20A and 20B are diagrams showing the positional relationship between the reading unit 207 and the conveyance guide 203 in conveyance guide detection. FIG. 20A is a top view of a state in which the conveyance guide 203 is attached to the glass frame 204. FIG. 20B is a cross-sectional view taken along line G-G in FIG. 20A, and is a diagram of the reading unit 207 and the conveyance guide 203 as viewed in the main scanning direction (Y direction). In conveyance guide detection, the reading unit 207 performs a reading operation at the conveyance guide detection position h. The conveyance guide detection position h is a position directly below the black Mylar sheet 203*b* and the cutout portions BC, and is a position where the image sensor 206 can project light to the black Mylar sheet 203*b*. The reading unit 207 reads the black Mylar sheet 203*b* and the cutout portions BC through the glass base 202 and the transparent Mylar sheet 203*c* with the image sensor 206.

As described above, in the first embodiment, the image sensor 206 for an operation of reading an image on a document is configured to double as a sensor for detecting the attachment state of the conveyance guide 203. This configuration eliminates the need for an additional sensor for detecting the conveyance guide 203. Accordingly, the detection operation of the attachment state of the conveyance guide 203 can be performed with a simple configuration while limiting an increase in the number of devices.

Figure 21:
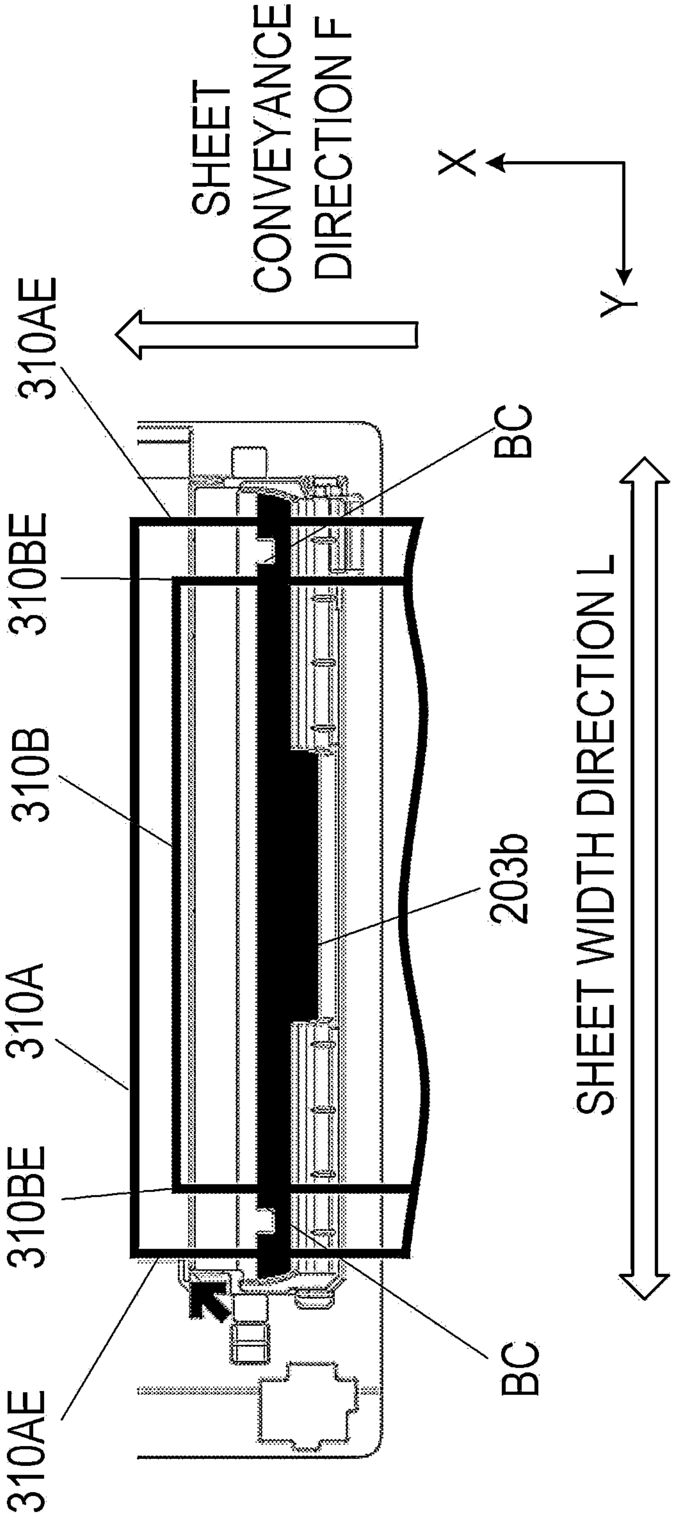
FIG. 21 is a diagram showing the positional relationship between document sizes and cutout portions of the first embodiment.

FIG. 21 is a diagram showing the positional relationship between documents 310 and the cutout portions BC of the black Mylar sheet 203*b*. In FIG. 21, white arrows indicate a sheet conveyance direction F and a sheet width direction L. The conveyance direction F is substantially parallel to the sub-scanning direction (X direction), the sheet width direction L is substantially parallel to the main scanning direction (Y direction), and the conveyance direction F and the sheet width direction L intersect with each other.

In FIG. 21, the outlines of two types of documents 310A and 310B of different sizes are indicated by solid lines. In the range of sheet widths that are readable by the image reading apparatus 100, the document 310A is a standard-sized document of the greatest sheet width, and the document 310B is a standard-sized document of the second greatest sheet width after the document 310A. The cutout portions BC are formed to achieve a positional relationship in which edges 310AE of the document 310A pass outside of the two cutout portions BC in the sheet width direction L, and edges 310BE of the document 310B pass between the two cutout portions BC in the sheet width direction L. In other words, the cutout portions BC are formed at positions in the sheet width direction L that are aligned with the document 310A that has the greatest width among the readable standard-sized sheets, and not aligned with the other standard-sized sheets. The configuration may prevent the occurrence of a problem where an edge of the document being conveyed in the conveyance direction F is caught by a cutout portion BC causing the document to be damaged, or the document is skewed.

Illustrative detection patterns P of the image sensor 206 are now described with regard to a situation where the conveyance guide 203 is normally attached to the predetermined position of the image reading apparatus 100, a situation where it is not attached to the predetermined position, and a situation where it is removed from the image reading apparatus 100.

Figure 22A:
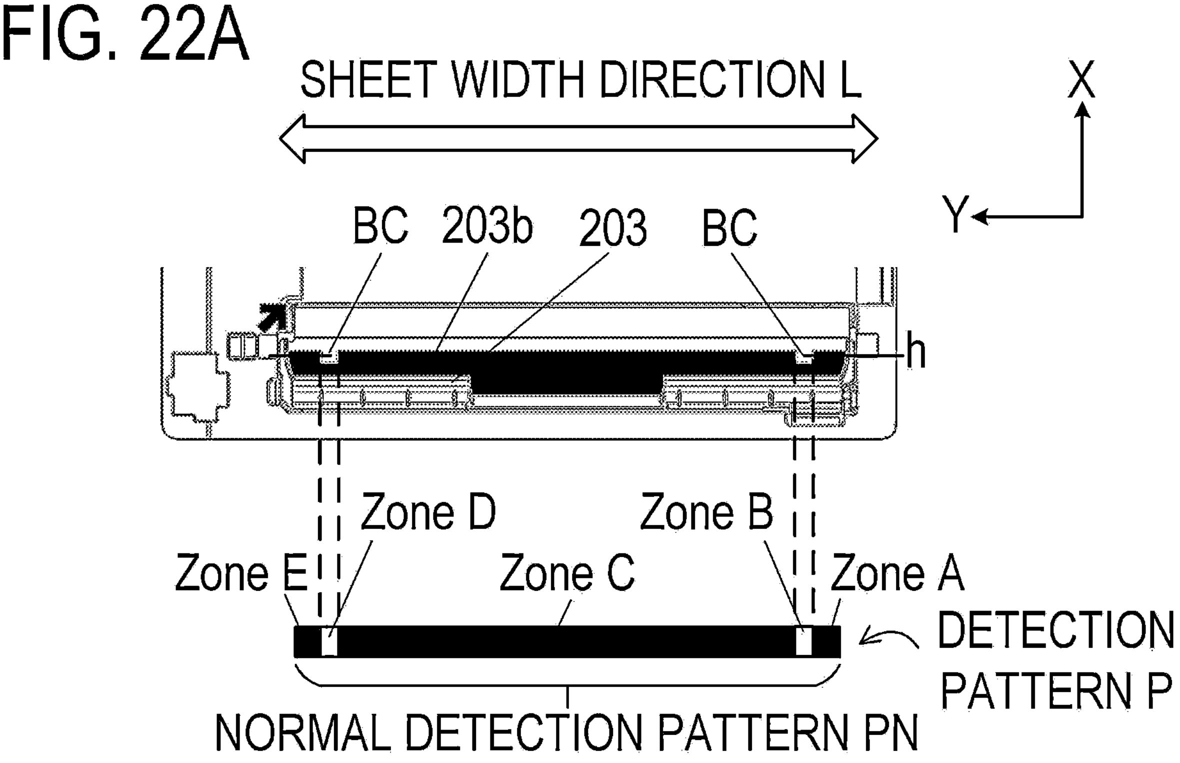
FIGS. 22A and 22B are explanatory diagrams of detection patterns obtained by the image sensor of the first embodiment.

FIG. 22A shows a top view of the scanner portion 200 and the detection pattern P in a situation where the conveyance guide 203 is attached to the predetermined position. The detection pattern P is obtained by the image sensor 206 detecting the conveyance guide 203 at the conveyance guide detection position h. The detection pattern P is divided into regions of Zone A, Zone B, Zone C, Zone D, and Zone E in the sheet width direction L.

When the conveyance guide 203 is in the state shown in FIG. 22A, a black pattern obtained by reading the black Mylar sheet 203*b* is output in Zone A, Zone C, and Zone E of the detection pattern P. On the other hand, in Zone B and Zone D of the detection pattern P, a white pattern obtained by reading the white pressing plate 308 through the cutout portion BC is output. As with the detection pattern P shown in FIG. 22A, a detection pattern P in which a black pattern is output in Zone A, Zone C, and Zone E and a white pattern is output in Zone B and Zone D is set as a normal detection pattern PN. When the detection pattern P matches the normal detection pattern PN, it is determined that the conveyance guide 203 is attached to the predetermined position. The determination of whether the conveyance guide 203 is attached to the predetermined position based on the detection pattern P may be configured to be performed by the CPU 115 or may be configured to be performed by another control portion.

Figure 22B:
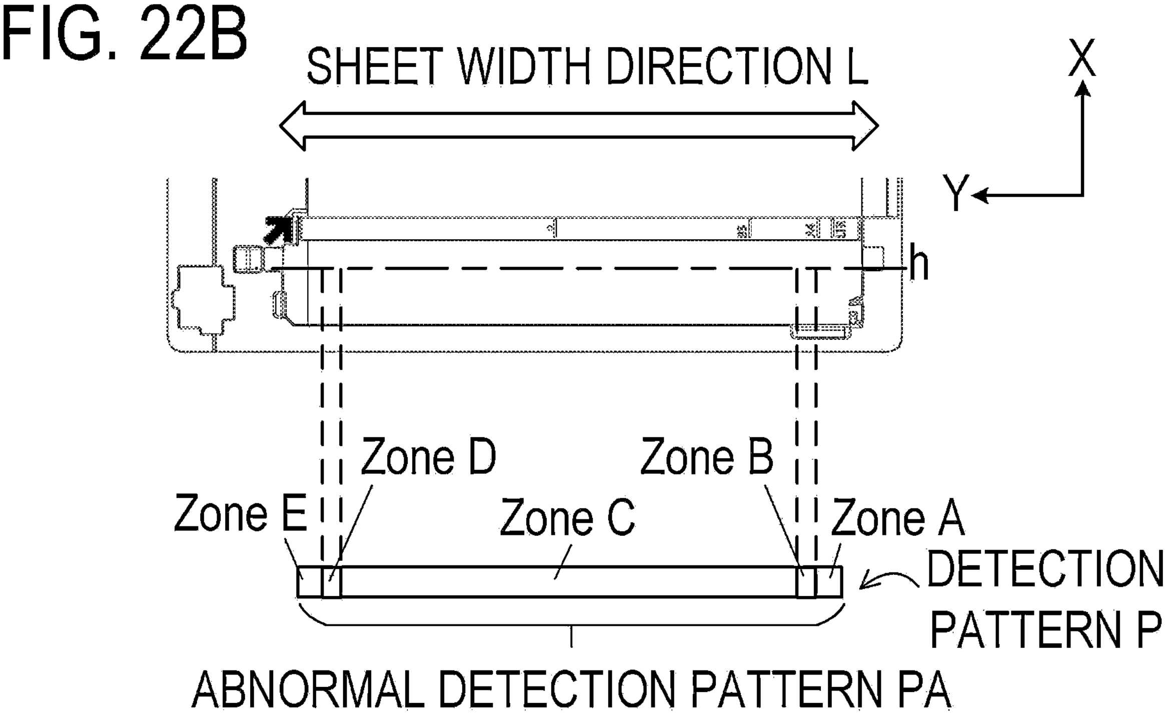

FIG. 22B shows a top view of the scanner portion 200 and the detection pattern P in a situation where the conveyance guide 203 is removed. When the conveyance guide 203 is in the state shown in FIG. 22B, a white pattern obtained by reading the white pressing plate 308 (FIG. 2) is output in Zone A, Zone B, Zone C, Zone D, and Zone E of the detection pattern P. This is because the white pressing plate 308 is exposed over the entire range in the sheet width direction L at the conveyance guide detection position h. Since this detection pattern P is an abnormal detection pattern PA, which does not match the normal detection pattern PN, it is determined that the conveyance guide 203 is not attached to the predetermined position, and a conveyance guide detection error is displayed. The error may be displayed on the display screen of the image reading apparatus 100 or the printing apparatus 400, and the multifunction apparatus 1 may be configured to notify the user of the occurrence of an error by sound.

Figure 23A:
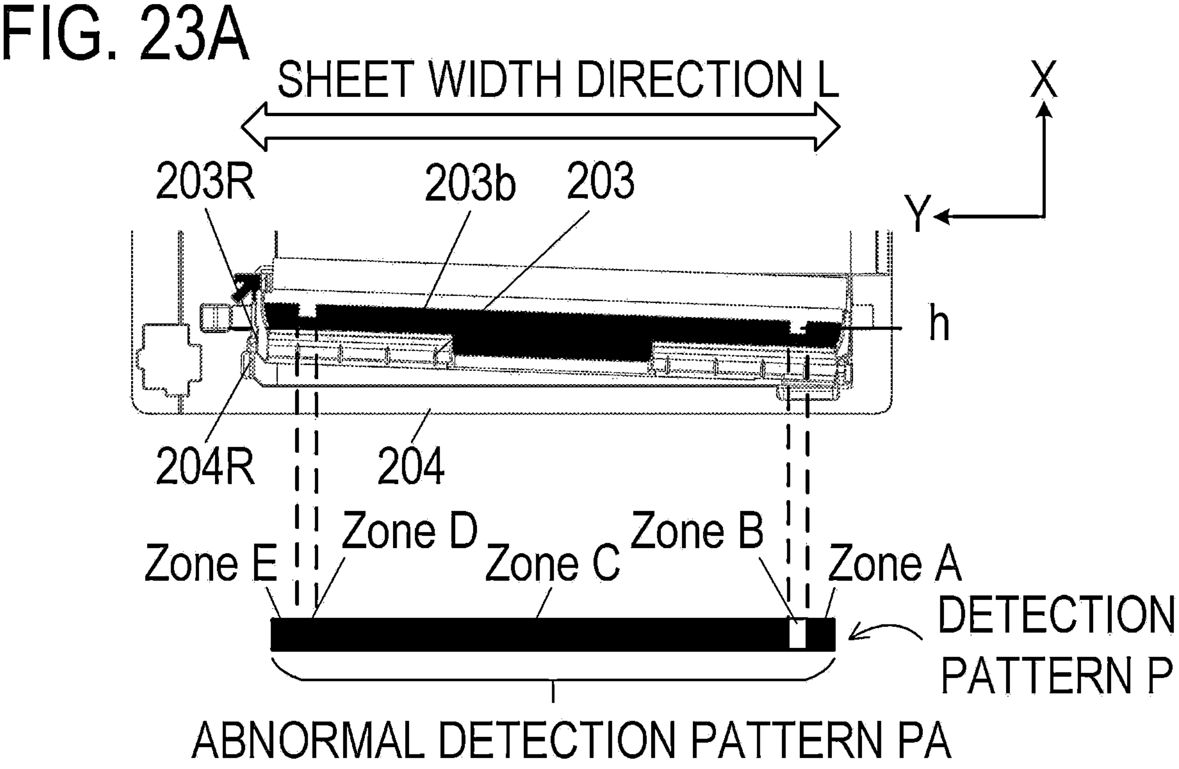
FIGS. 23A and 23B are diagrams showing examples of abnormal attachment states of the conveyance guide of the first embodiment.

FIG. 23A shows an example of a top view of the scanner portion 200 and the detection pattern P in a situation where the attachment state of the conveyance guide 203 is abnormal. FIG. 23A shows a state in which the engaging portion 203R of the conveyance guide 203 is separated from the engaged portion 204R of the glass frame 204 in the X direction. In this example, the engaging portion 203F of the conveyance guide 203 is in engagement with the engaged portion 204F of the glass frame 204, and the conveyance guide 203 is attached in an inclined state.

When the conveyance guide 203 is in the state shown in FIG. 23A, a black pattern obtained by reading the black Mylar sheet 203*b* is output in Zone A, Zone C, Zone D, and Zone E of the detection pattern P. This is because the cutout portion BC closer to the engaging portion 203R is displaced. On the other hand, in Zone B of the detection pattern P, a white pattern obtained by reading the white pressing plate 308 (FIG. 2) is output. Since this detection pattern P is an abnormal detection pattern PA, which does not match the normal detection pattern PN, it is determined that the conveyance guide 203 is not attached to the predetermined position, and a conveyance guide detection error is displayed.

In the first embodiment, in detecting the attachment state of the conveyance guide 203, the detection patterns P that do not match the normal detection pattern PN are collectively treated as abnormal detection patterns PA. However, an abnormal detection pattern PA may be managed differently according to the detection pattern P. It may be configured such that the removal of the conveyance guide 203 is displayed as an error when the abnormal detection pattern PA shown in FIG. 22B is detected, and that the abnormal attachment of the conveyance guide 203 is displayed as an error when the abnormal detection pattern PA shown in FIG. 23A is detected.

Figure 23B:
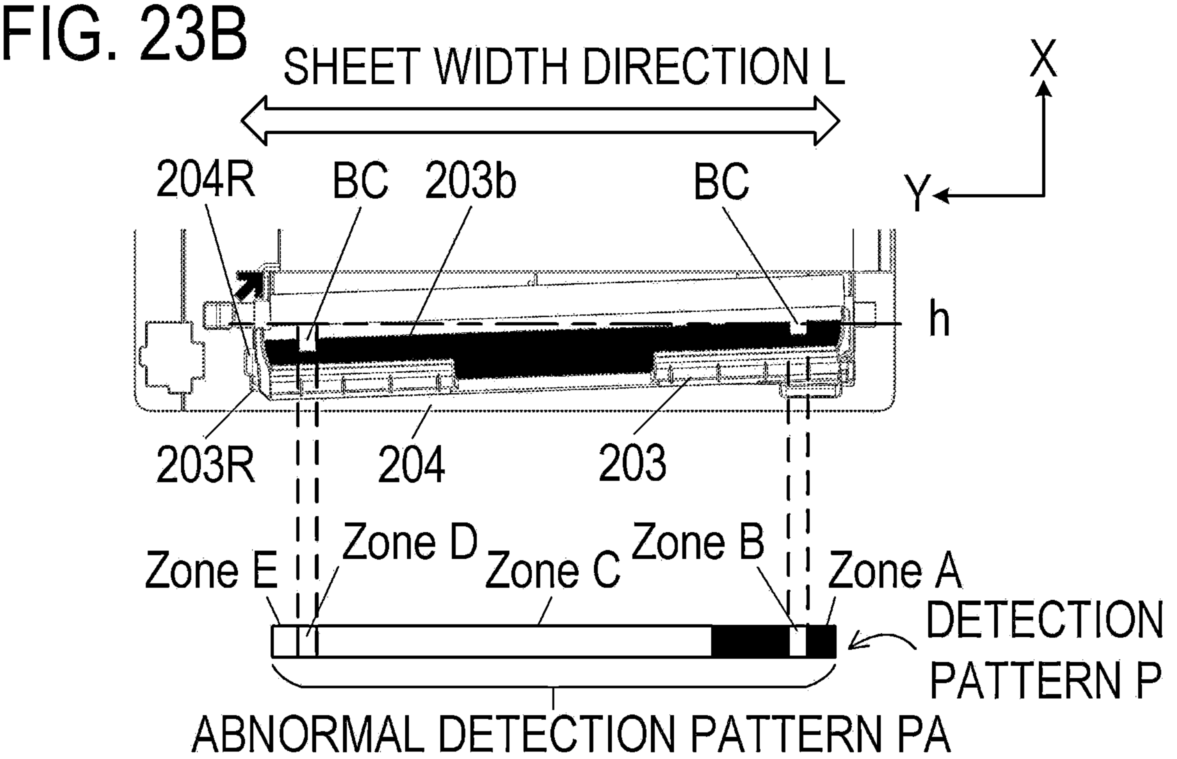

FIG. 23B shows an example of a top view of the scanner portion 200 and the detection pattern P in a situation where the attachment state of the conveyance guide 203 is abnormal. FIG. 23B shows a state in which the engaging portion 203R of the conveyance guide 203 is separated from the engaged portion 204R of the glass frame 204 in the direction opposite to FIG. 23A. In this example, the engaging portion 203F of the conveyance guide 203 is in engagement with the engaged portion 204F of the glass frame 204, and the conveyance guide 203 is attached in an inclined state.

When the conveyance guide 203 is in the state shown in FIG. 23B, a black pattern obtained by reading the black Mylar sheet 203*b* is output in Zone A and a part of Zone C of the detection pattern P. On the other hand, a white pattern obtained by reading the white pressing plate 308 (FIG. 2) is output in Zone B, Zone D, Zone E, and a part of Zone C of the detection pattern P. This is because the inclination of the conveyance guide 203 has increased the region of the white pressing plate 308 that is not covered by the black Mylar sheet 203*b* and is thus exposed at the conveyance guide detection position h. Since this detection pattern P is an abnormal detection pattern PA, which does not match the normal detection pattern PN, it is determined that the conveyance guide 203 is not attached to the predetermined position, and a conveyance guide detection error is displayed.

Figure 24A:
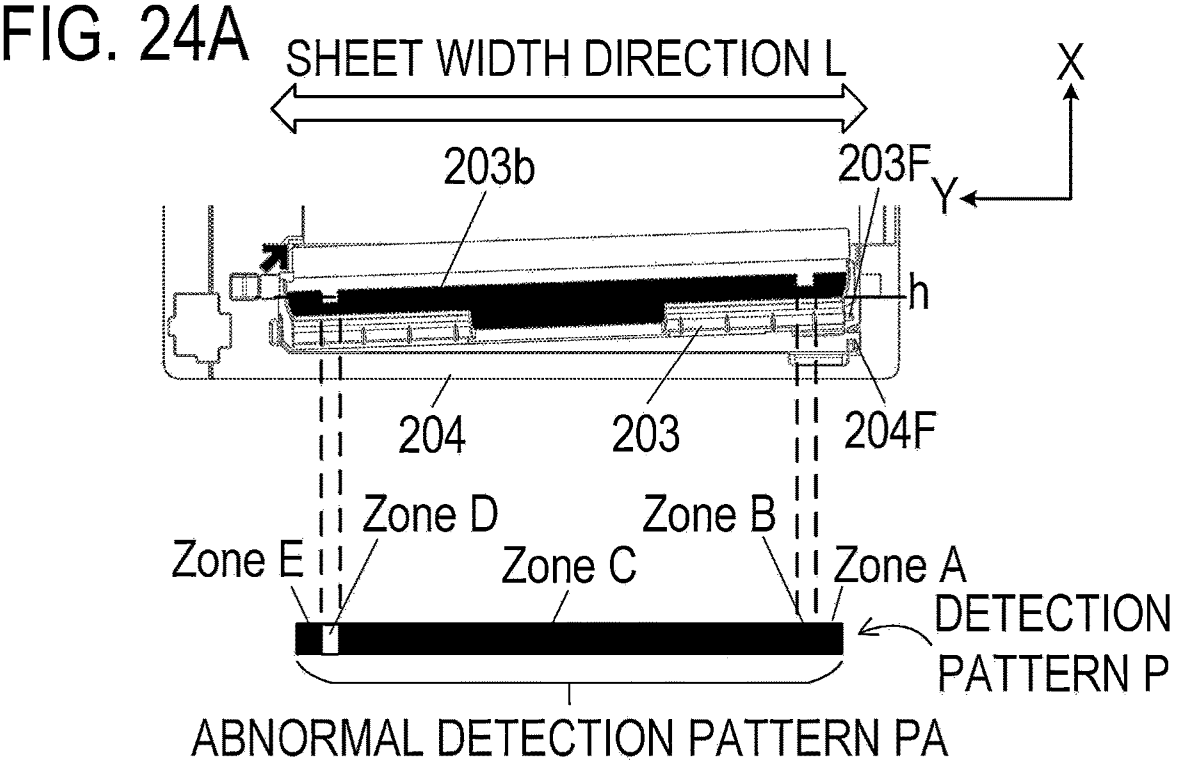
FIGS. 24A and 24B are diagrams showing examples of abnormal attachment states of the conveyance guide of the first embodiment.

FIG. 24A shows an example of a top view of the scanner portion 200 and the detection pattern P in a situation where the attachment state of the conveyance guide 203 is abnormal. FIG. 24A shows a state in which the engaging portion 203F of the conveyance guide 203 is separated from the engaged portion 204F of the glass frame 204 in the X direction. In this example, the engaging portion 203R of the conveyance guide 203 is in engagement with the engaged portion 204R of the glass frame 204, and the conveyance guide 203 is attached in an inclined state.

When the conveyance guide 203 is in the state shown in FIG. 24A, a black pattern obtained by reading the black Mylar sheet 203*b* is output in Zone A, Zone B, Zone C, and Zone E of the detection pattern P. This is because the cutout portion BC closer to the engaging portion 203F is displaced. On the other hand, in Zone D of the detection pattern P, a white pattern obtained by reading the white pressing plate 308 (FIG. 2) is output. Since this detection pattern P is an abnormal detection pattern PA, which does not match the normal detection pattern PN, it is determined that the conveyance guide 203 is not attached to the predetermined position, and a conveyance guide detection error is displayed.

Figure 24B:
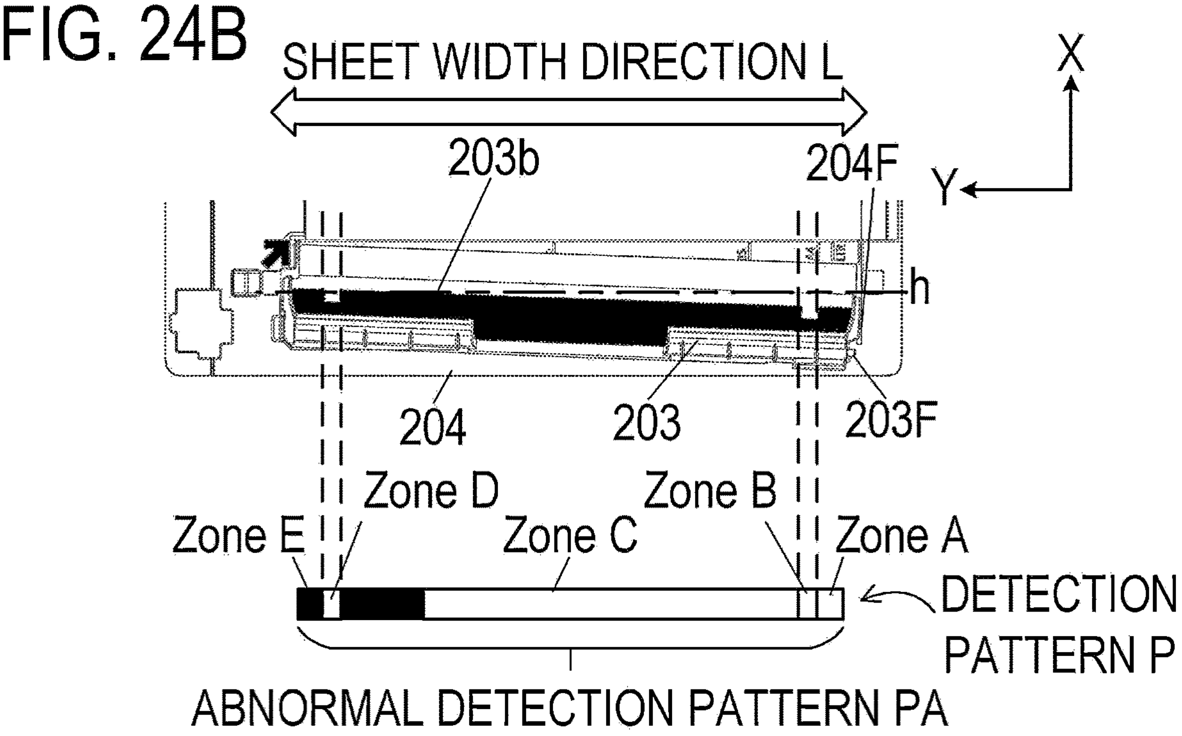

FIG. 24B shows an example of a top view of the scanner portion 200 and the detection pattern P in a situation where the attachment state of the conveyance guide 203 is abnormal. FIG. 24B shows a state in which the engaging portion 203F of the conveyance guide 203 is separated from the engaged portion 204F of the glass frame 204 in the direction opposite to FIG. 24A. In this example, the engaging portion 203R of the conveyance guide 203 is in engagement with the engaged portion 204R of the glass frame 204, and the conveyance guide 203 is attached in an inclined state.

When the conveyance guide 203 is in the state shown in FIG. 24B, a black pattern obtained by reading the black Mylar sheet 203*b* is output to Zone E and a part of Zone C of the detection pattern P. On the other hand, a white pattern obtained by reading the white pressing plate 308 is output in Zone A, Zone B, Zone D, and a part of Zone C of the detection pattern P. This is because the inclination of the conveyance guide 203 has increased the region of the white pressing plate 308 that is not covered by the black Mylar sheet 203*b* and is thus exposed at the conveyance guide detection position h. Since this detection pattern P is an abnormal detection pattern PA, which does not match the normal detection pattern PN, it is determined that the conveyance guide 203 is not attached to the predetermined position, and a conveyance guide detection error is displayed.

As described above, the first embodiment has multiple cutout portions BC at different positions in the sheet width direction L of the black Mylar sheet 203*b*. This allows for the detection of abnormal attachment state of the conveyance guide 203 irrespective of the inclination direction of the conveyance guide 203. In applying the present invention, three or more cutout portions BC may be formed in the black Mylar sheet 203*b*, or the black Mylar sheet 203*b* may be formed by multiple sheet members.

Figure 25A:
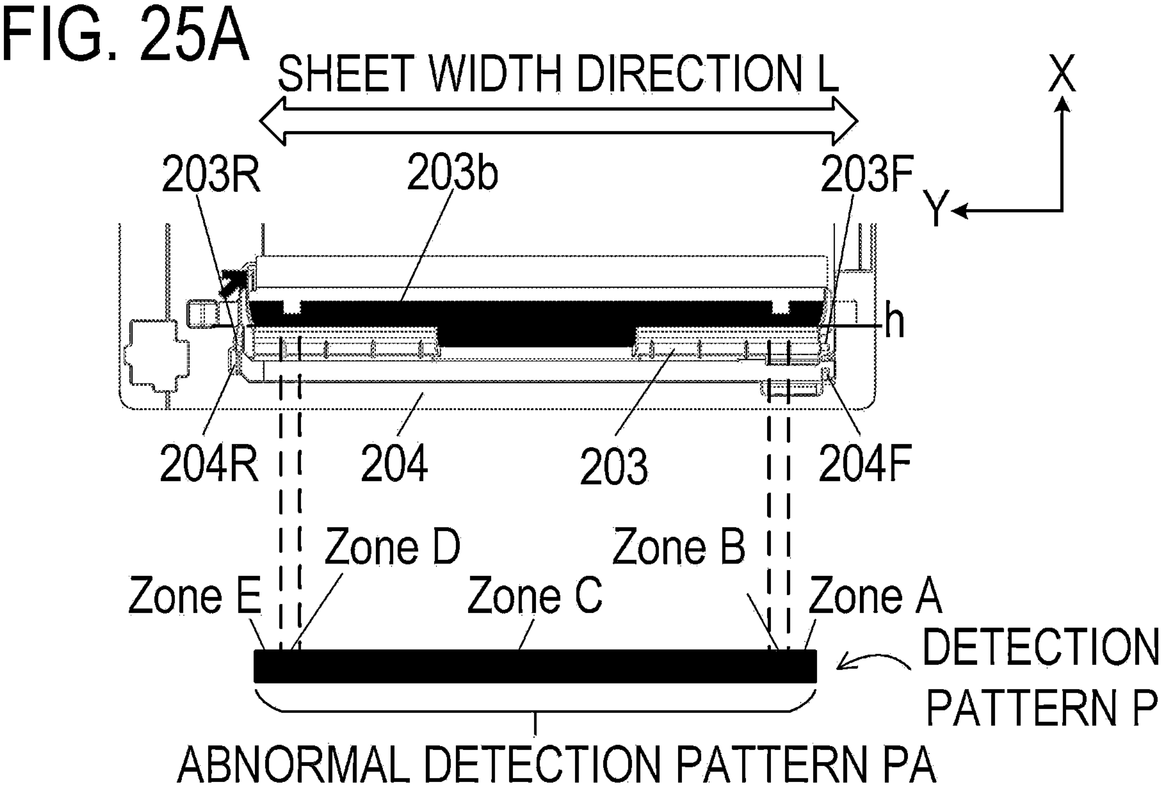
FIGS. 25A and 25B are diagrams showing examples of abnormal attachment states of the conveyance guide of the first embodiment.

FIG. 25A shows an example of a top view of the scanner portion 200 and the detection pattern P in a situation where the attachment state of the conveyance guide 203 is abnormal. In this example, both the engaging portions 203F and 203R of the conveyance guide 203 are separated from the engaged portions 204F and 204R of the glass frame 204 in the X direction.

When the conveyance guide 203 is in the state shown in FIG. 25A, a black pattern obtained by reading the black Mylar sheet 203*b* is output in Zone A, Zone B, Zone C, Zone D, and Zone E of the detection pattern P. On the other hand, a white pattern obtained by reading the white pressing plate 308 is not output in any region of the detection pattern P. This is because the conveyance guide 203 is displaced from the normal attachment position in a parallel manner, and the black Mylar sheet 203*b* covers the white pressing plate 308 over the entire range in the sheet width direction L at the conveyance guide detection position h. Since this detection pattern P is an abnormal detection pattern PA, which does not match the normal detection pattern PN, it is determined that the conveyance guide 203 is not attached to the predetermined position, and a conveyance guide detection error is displayed.

Figure 25B:
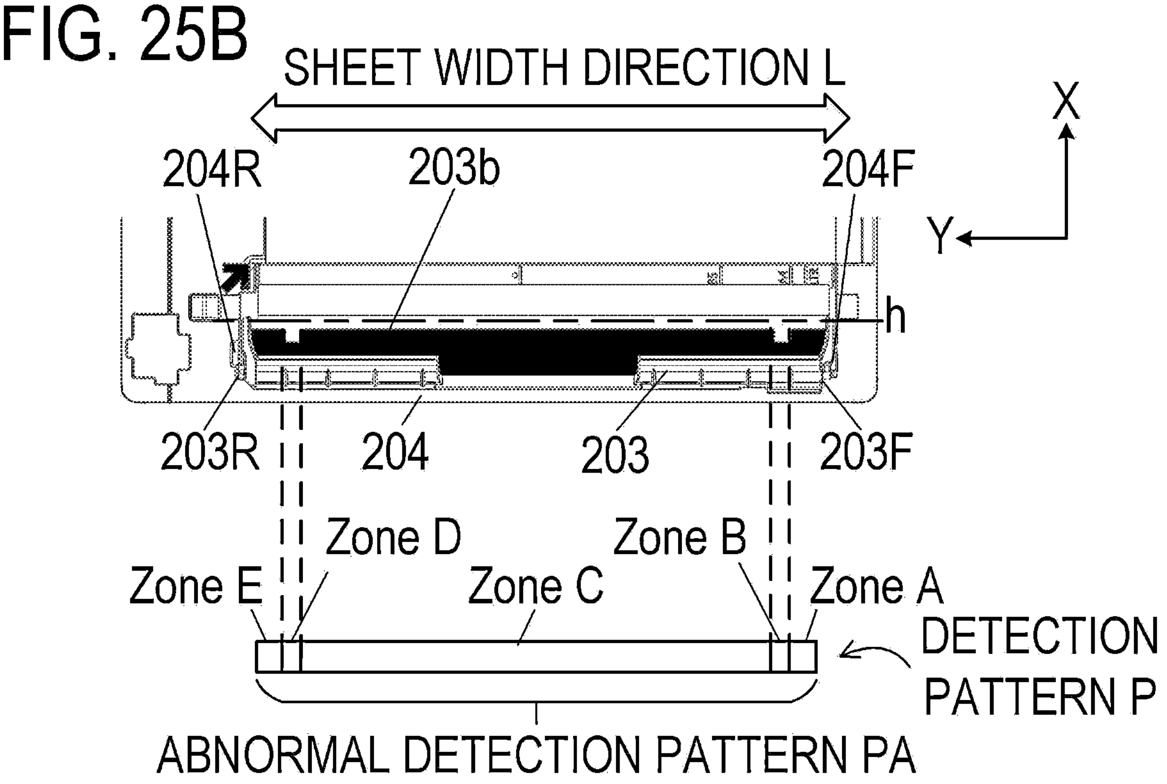

FIG. 25B shows an example of a top view of the scanner portion 200 and the detection pattern P in a situation where the attachment state of the conveyance guide 203 is abnormal. In this example, both the engaging portions 203F and 203R of the conveyance guide 203 are removed from the engaged portions 204F and 204R of the glass frame 204 in the direction opposite to FIG. 25A.

When the conveyance guide 203 is in the state shown in FIG. 25B, a white pattern obtained by reading the white pressing plate 308 is output in Zone A, Zone B, Zone C, Zone D, and Zone E of the detection pattern P. On the other hand, a black pattern obtained by reading the black Mylar sheet 203*b* is not output in any region of the detection pattern P. This is because the conveyance guide 203 is displaced from the normal attachment position in a parallel manner, and the white pressing plate 308 is exposed over the entire area in the sheet width direction L at the conveyance guide detection position h. Since this detection pattern P is an abnormal detection pattern PA, which does not match the normal detection pattern PN, it is determined that the conveyance guide 203 is not attached to the predetermined position, and a conveyance guide detection error is displayed.

Figure 26A:
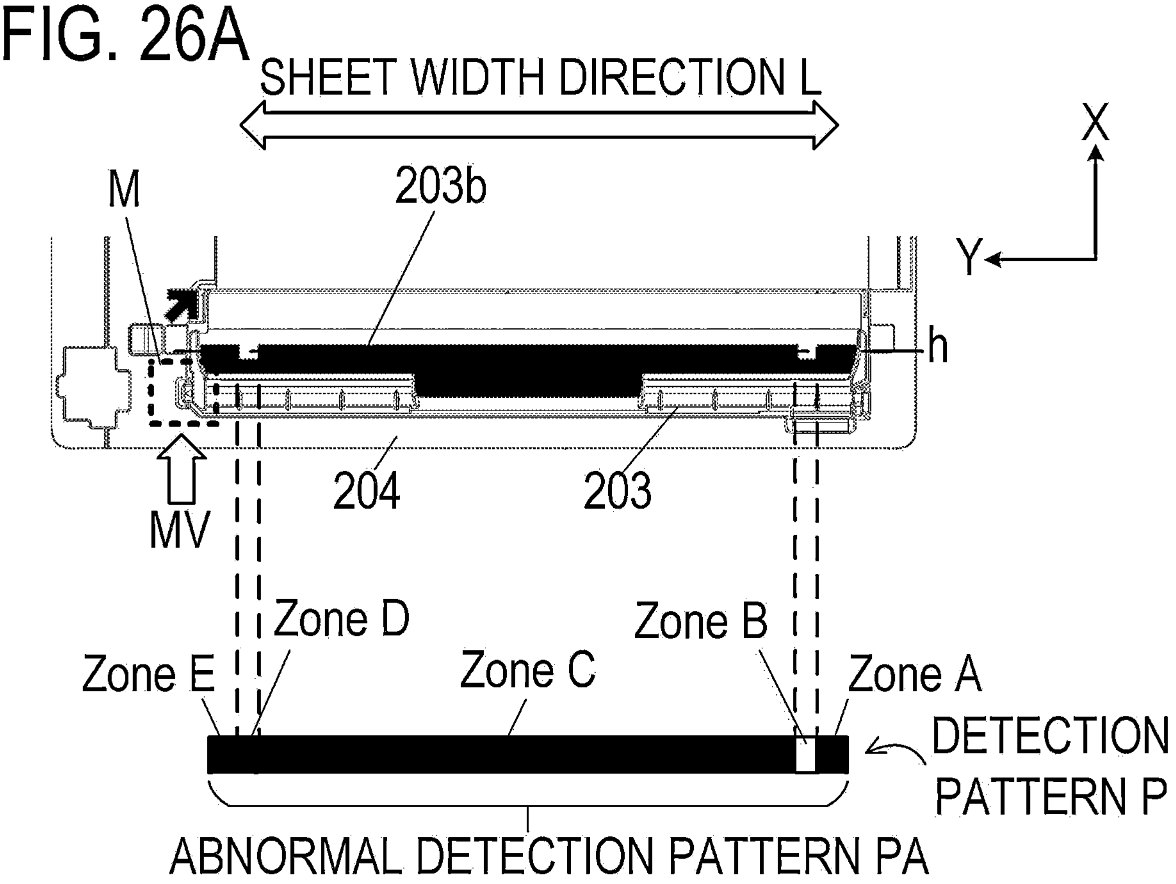
FIGS. 26A and 26B are diagrams showing an example of an abnormal attachment state of the conveyance guide of the first embodiment.
Figure 26B:
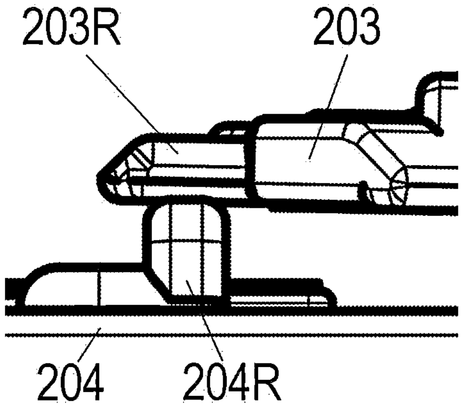

FIG. 26A shows an example of a top view of the scanner portion 200 and the detection pattern P in a situation where the attachment state of the conveyance guide 203 is abnormal. FIG. 26B is an enlarged view of region M in the state of FIG. 26A as viewed from an MV direction. Region M is a region around the engaging portion 203R of the conveyance guide 203 and the engaged portion 204R of the glass frame 204, and the MV direction is substantially parallel to the X direction. In this example, the engaging portion 203R of the conveyance guide 203 is placed on the upper side of the engaged portion 204R of the glass frame 204.

When the conveyance guide 203 is in the state shown in FIGS. 26A and 26B, a black pattern obtained by reading the black Mylar sheet 203*b* is output in Zone A, Zone C, Zone D, and Zone E of the detection pattern P. On the other hand, a white pattern obtained by reading the white pressing plate 308 is output in Zone B. As such, when the engaging portion 203R of the conveyance guide 203 is placed on the upper side of the engaged portion 204R of the glass frame 204 in the Z direction, the white pressing plate 308 is farther from the reading unit 207, resulting in a gray color being output in Zone D. In the first embodiment, since a gray color is set to be treated as a black pattern, a black pattern is output in Zone D. Since this detection pattern P is an abnormal detection pattern PA, which does not match the normal detection pattern PN, it is determined that the conveyance guide 203 is not attached to the predetermined position, and a conveyance guide detection error is displayed.

Figure 27A:
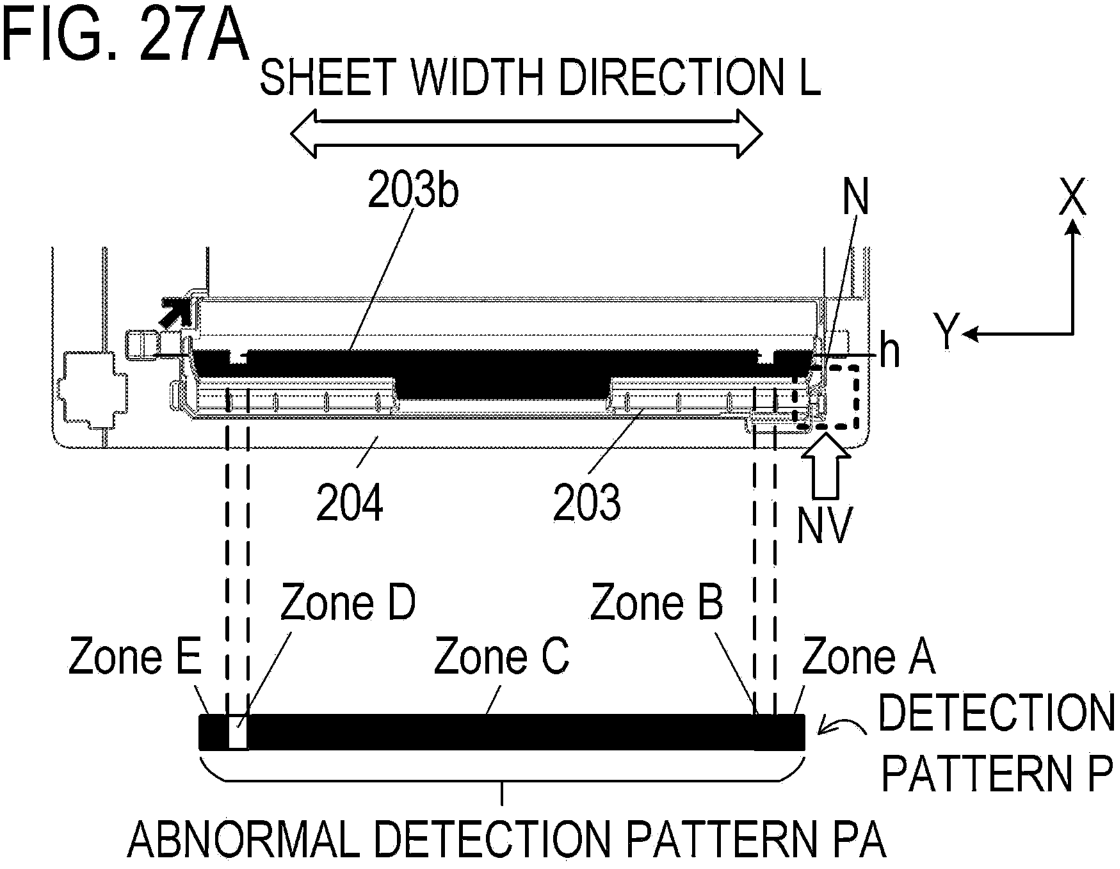
FIGS. 27A and 27B are diagrams showing an example of an abnormal attachment state of the conveyance guide of the first embodiment.
Figure 27B:
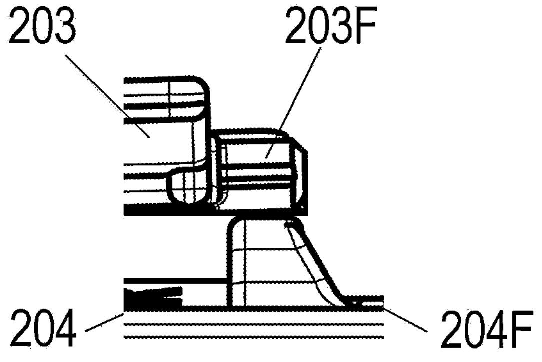

FIG. 27A shows an example of a top view of the scanner portion 200 and the detection pattern P in a situation where the attachment state of the conveyance guide 203 is abnormal. FIG. 27B is an enlarged view of region N in the state of FIG. 27A as viewed from an NV direction. Region N is a region around the engaging portion 203F of the conveyance guide 203 and the engaged portion 204F of the glass frame 204, and the NV direction is substantially parallel to the X direction. In this example, the engaging portion 203F of the conveyance guide 203 is placed on the upper side of the engaged portion 204F of the glass frame 204.

When the conveyance guide 203 is in the state shown in FIGS. 27A and 27B, a black pattern obtained by reading the black Mylar sheet 203*b* is output in Zone A, Zone B, Zone C, and Zone E of the detection pattern P. On the other hand, a white pattern obtained by reading the white pressing plate 308 is output in Zone D. As such, when the engaging portion 203F of the conveyance guide 203 is placed on the upper side of the engaged portion 204F of the glass frame 204 in the Z direction, the white pressing plate 308 is farther from the reading unit 207, resulting in a gray color being output in Zone B. A black pattern is thus output in Zone B. Since this detection pattern P is an abnormal detection pattern PA, which does not match the normal detection pattern PN, it is determined that the conveyance guide 203 is not attached to the predetermined position, and a conveyance guide detection error is displayed.

As described above, in the first embodiment, the black Mylar sheet 203*b* and the reading unit 207 function as a detector for detecting whether the conveyance guide 203 is attached to a predetermined position. According to this configuration, a detection pattern P in a situation where the conveyance guide 203 is removed or the attachment state of the conveyance guide 203 is abnormal is detected differently from a detection pattern P in a situation where the attachment state of the conveyance guide 203 is normal. The control portion is configured to be capable of determining whether the sheet reading operation can be performed on the basis of the detection result. Accordingly, the configuration of the first embodiment enables the detection of whether the conveyance guide 203 is attached to a predetermined position and whether the attachment state is normal, thereby limiting sheet jams.

Other Embodiments

It should be noted that the configuration of each of the above-described apparatuses and the operation sequence in the process before reprinting are merely examples of the present invention, and the present invention is not limited to the above-described embodiments. Additionally, not all of the configurations of the embodiments described above are necessary for applying the present invention. Other embodiments according to the present invention are now described. In the following description of other embodiments, the same components as in the first embodiment will be given the same reference numerals, and the descriptions will be omitted. Only the characteristic configurations of the embodiments will be described below.

Figure 28:
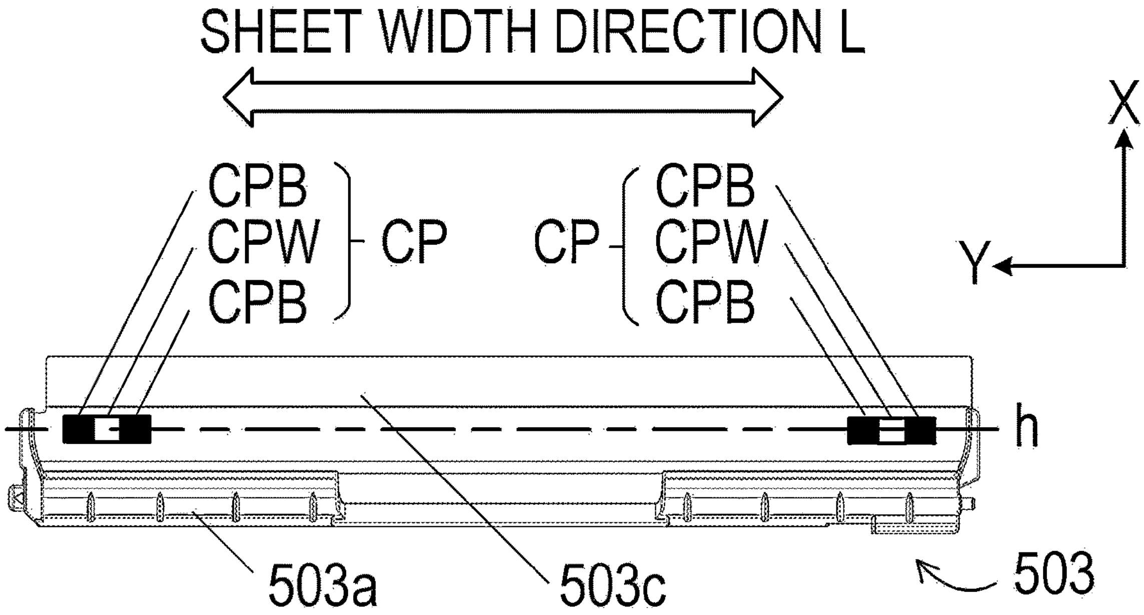
FIG. 28 is an explanatory diagram of a conveyance guide of another embodiment.

FIG. 28 is a diagram showing a conveyance guide 503 according to another embodiment. The conveyance guide 503 includes a Mylar sheet holding member 503*a* and a transparent Mylar sheet 503*c*, which transmits light. The transparent Mylar sheet 503*c* includes print portions CP, which hardly transmits light, on the non-conveyance surface. Each print portion CP includes a white print portion CPW and a black print portions CPB. The print portions CP, each including a black print portion CPB, a white print portion CPW, and a black print portion CPB arranged in this order in the main scanning direction (Y direction), are located in opposite end portions in the main scanning direction of the transparent Mylar sheet 503*c*.

To detect the conveyance guide 503, the reading unit 207 reads the print portions CP at the conveyance guide detection position h, thereby detecting the attachment state of the conveyance guide 503. That is, this example is configured such that the print portions CP provide the function of the black Mylar sheet 203*b* of the first embodiment. The print portions CP and the reading unit 207 function as a detector that detects whether the conveyance guide 203 is attached to a predetermined position. As described above, the detection pattern P detected by the reading unit 207 does not necessarily need to be detected over substantially the entire range of the conveyance guide 203 in the sheet width direction L. This configuration can still detect the attachment state of the conveyance guide 203, such as whether it is attached or removed and whether it is attached to a predetermined position, thereby limiting sheet jams.

Figure 29A:
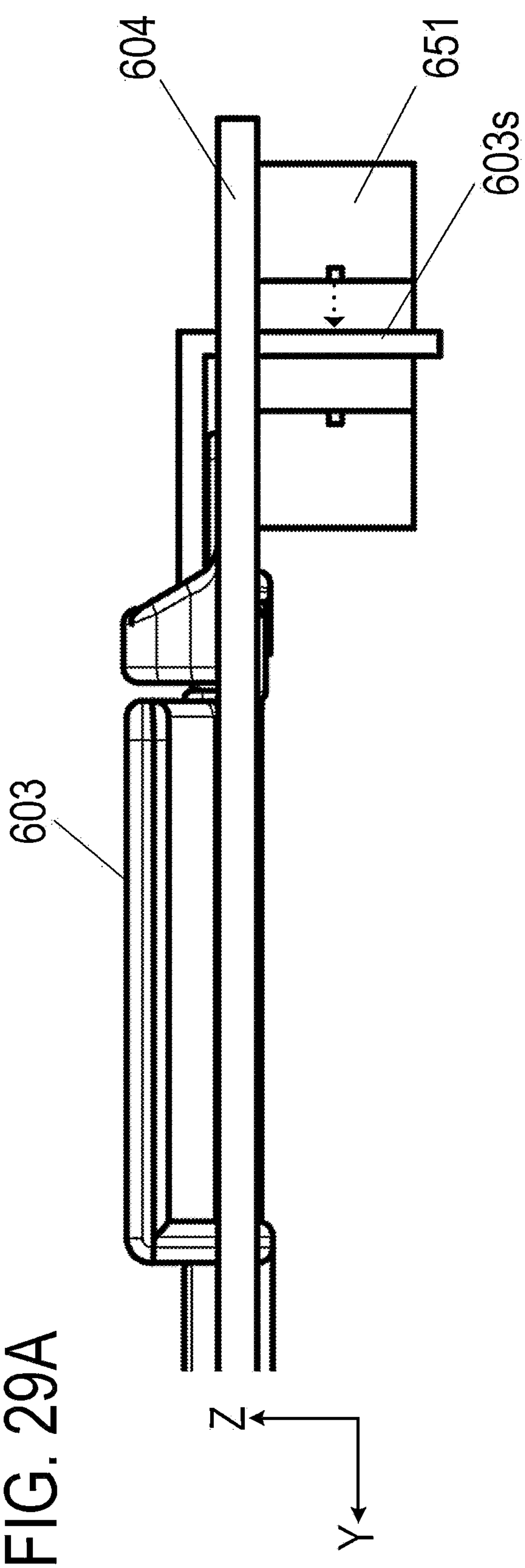
FIGS. 29A and 29B are explanatory diagrams of a conveyance guide detection configuration of another embodiment.
Figure 29B:
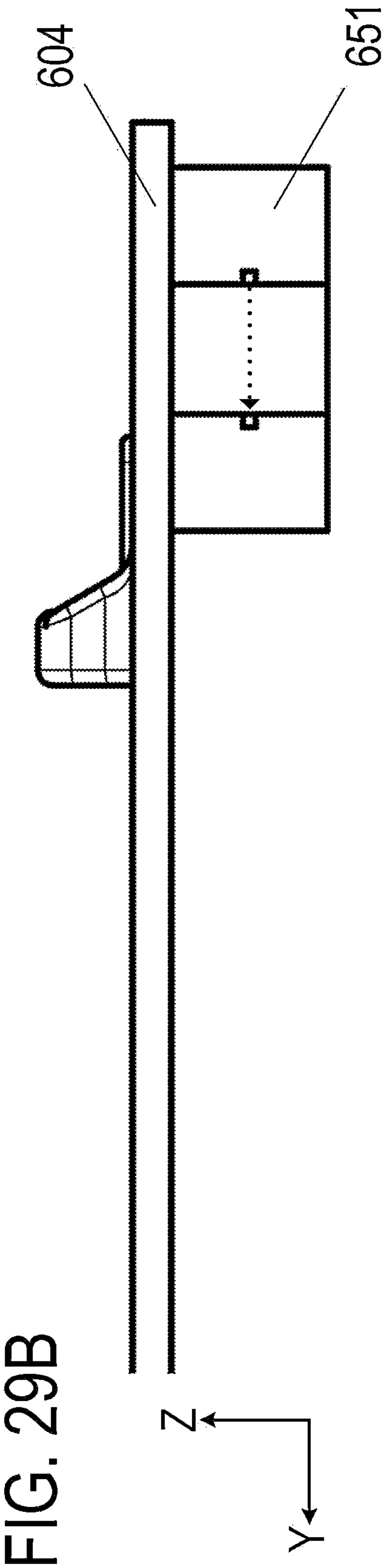

FIGS. 29A and 29B are diagrams showing the detection configuration of a conveyance guide 603 according to another embodiment. In this example, a transmissive optical sensor 651, which includes a light projection portion and a sensor portion, is placed on the glass frame 604. The conveyance guide 603 includes a light shield portion 603*s*, which shields light. When the conveyance guide 603 is attached to a predetermined position, the light shield portion 603*s* is located between the light projection portion and the sensor portion of the transmissive optical sensor 651. The light projected by the light projection portion is blocked before it reaches the sensor portion.

FIG. 29A shows a state in which the conveyance guide 603 is attached to the glass frame 204. At this time, the light shield portion 603*s* of the conveyance guide 603 shields the light from the transmissive optical sensor 651. In this example, it is determined that the conveyance guide 603 is attached to the predetermined position when no light is detected by the sensor portion.

FIG. 29B shows a state in which the conveyance guide 603 is removed from the glass frame 604. At this time, the light shield portion 603*s* of the conveyance guide 603 does not shield the light from the transmissive optical sensor 651, and the sensor portion detects the light projected from the light projection portion. In this example, it is determined that the conveyance guide 603 is removed when the sensor portion detects light. That is, in this example, the light shield portion 603*s* and the transmissive optical sensor 651 function as a detector for detecting whether the conveyance guide 603 is attached to a predetermined position. In this manner, it is also possible to prevent the omission of attaching the conveyance guide 603 and thus limit sheet jams by a configuration that includes a light unit including a light projection portion and a sensor portion and detects whether the conveyance guide 603 is attached on the basis of whether the sensor portion detects light.

Figure 30A:
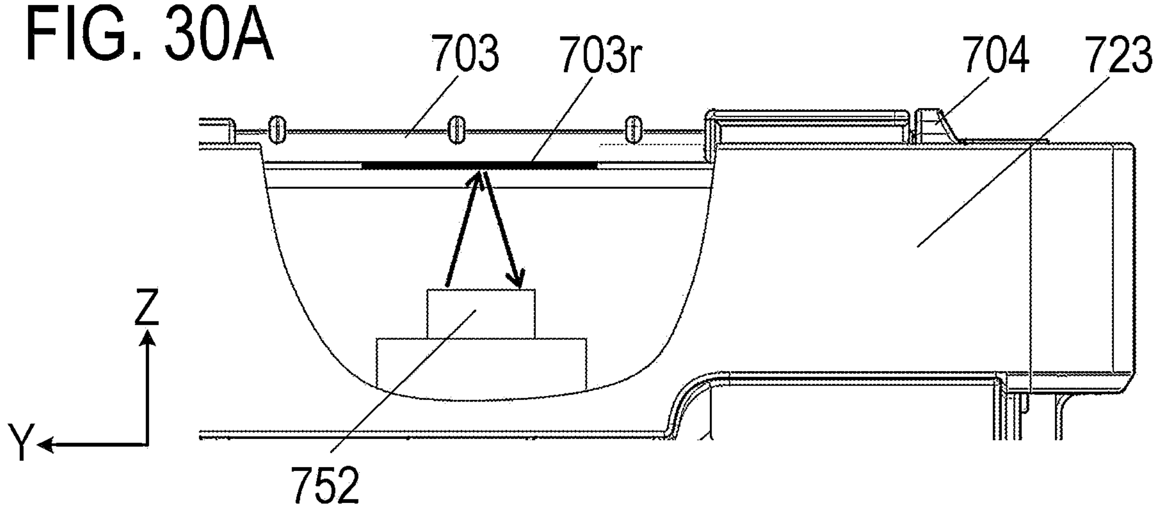
FIGS. 30A and 30B are explanatory diagrams of a conveyance guide detection configuration of another embodiment.
Figure 30B:
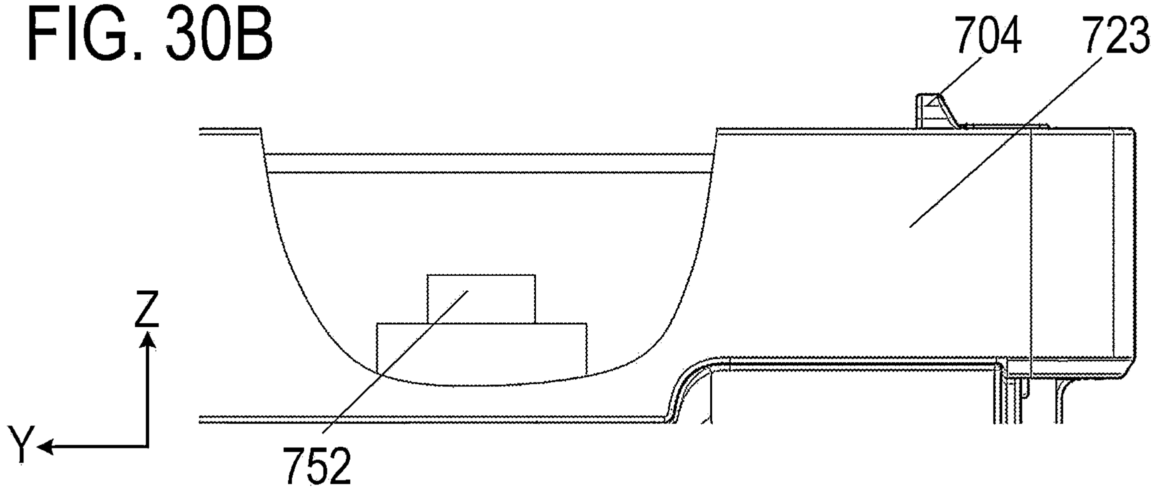

FIGS. 30A and 30B are diagrams showing the detection configuration of a conveyance guide 703 according to another embodiment. In this example, a reflective optical sensor 752, which has a light projection portion and a sensor portion, is attached to a base frame 723, and the conveyance guide 703 includes a reflection member 703*r*, which reflects light. When the conveyance guide 703 is attached to a predetermined position, the reflection member 703*r* reflects the light projected from the light projection portion of the reflective optical sensor 752 toward the sensor portion.

FIG. 30A shows a state in which the conveyance guide 703 is attached to a glass frame 704. At this time, the reflection member 703*r* of the conveyance guide 703 reflects the light projected from the reflective optical sensor 752 toward the sensor portion of the reflective optical sensor 752. In FIG. 30A, arrows indicate the projection direction and the reflection direction of light. In this example, when the sensor portion detects light, the conveyance guide 703 reflects the light toward the reflective optical sensor 752, and it is determined that the conveyance guide 703 is attached to the predetermined position.

FIG. 30B shows a state in which the conveyance guide 703 is removed from the glass frame 704. At this time, the light projected from the light projection portion of the reflective optical sensor 752 is not reflected, and the sensor portion does not detect light. In this example, it is determined that the conveyance guide 603 is removed when no light is detected by the sensor portion. That is, in this example, the reflection member 703*r* and the reflective optical sensor 752 function as a detector for detecting whether the conveyance guide 703 is attached to a predetermined position. In this manner, it is also possible to prevent the omission of attaching the conveyance guide 703 and thus limit sheet jams by a configuration that has a light unit including a light projection portion and a sensor portion and detects whether the conveyance guide 703 is attached on the basis of whether the sensor portion detects light.

The present invention is not limited to the configurations of the embodiments described above, and can be applied to sheet feeding apparatuses other than image recording apparatuses. Furthermore, in the above-mentioned embodiments, the reading means for reading a document and the detector for detecting whether the conveyance guide is attached are configured as one unit (reading unit 207), but the reading means and the detector may be provided independent from each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image reading apparatus for reading an image on a sheet while conveying the sheet, the image reading apparatus comprising:

at least one processor operatively coupled to a memory, serving as:

a conveyance mechanism configured to convey the sheet;

a reading unit capable of reading the image on the sheet; and a conveyance guide configured to guide the sheet, the conveyance guide configured to be attachable and detachable with respect to a predetermined position of the image reading apparatus, wherein the reading unit is configured to be movable between a reading position for reading the image on the sheet and a detection position at which the reading unit detects whether the conveyance guide is attached to the predetermined position.

2. An image reading apparatus for reading an image on a sheet while conveying the sheet, the image reading apparatus comprising:

at least one processor operatively coupled to a memory, serving as:

a conveyance mechanism configured to convey the sheet;

a conveyance guide configured to guide the sheet, the conveyance guide configured to be attachable and detachable with respect to a predetermined position of the image reading apparatus;

a detection sensor configured to detect whether the conveyance guide is attached to the predetermined position; and a processing unit configured to determine whether to perform a sheet image reading operation on the basis of a detection result of the detection sensor.

3. The image reading apparatus according to claim 1, further comprising:

a glass base located above the reading unit and having an upper surface on which the conveyance guide is to be placed; and a processing unit capable of performing a first reading operation of reading the image on the sheet while conveying the sheet, and a second reading operation of reading the image on the sheet placed on the upper surface of the glass base while moving the reading unit.

4. The image reading apparatus according to claim 1, wherein the reading unit includes a light projection portion configured to project light toward the conveyance guide and an image sensor configured to detect light reflected from the conveyance guide, the reading unit configured to detect whether the conveyance guide is attached to the predetermined position on the basis of a detection result of the image sensor.

5. The image reading apparatus according to claim 4, wherein the conveyance guide includes a light-transmitting portion that transmits light and a non-light-transmitting portion that does not transmit light, and wherein the reading unit is configured to project light toward the sheet at the reading position such that the light is transmitted through the light-transmitting portion to read the image on the sheet.

6. The image reading apparatus according to claim 5, wherein the reading position is a position directly below the light-transmitting portion, and the detection position is a position directly below the non-light-transmitting portion, and wherein the reading unit is configured to detect whether the conveyance guide is attached to the predetermined position on the basis of a detection pattern detected on the basis of light detected by the image sensor.

7. The image reading apparatus according to claim 5, wherein the non-light-transmitting portion is a sheet member that does not transmit light, and the sheet member includes a plurality of cutout portions at different positions in a direction intersecting a sheet conveyance direction.

8. The image reading apparatus according to claim 7, wherein the cutout portions are located at positions in a sheet width direction perpendicular to the conveyance direction that are aligned with a sheet that has the greatest width among readable standard-sized sheets and not aligned with the other sheets.

9. The image reading apparatus according to claim 1, wherein the reading unit includes a light projection portion configured to project light and an image sensor configured to detect the light projected from the light projection portion, wherein the conveyance guide includes a light shield portion that is located between the light projection portion and the image sensor in a case when the conveyance guide is attached to the image reading apparatus, and is configured to shield light directed from the light projection portion to the image sensor, and wherein the reading unit is configured to detect whether the conveyance guide is attached to the predetermined position on the basis of whether the image sensor detects light.

10. The image reading apparatus according to claim 1, wherein the conveyance guide includes a reflection portion configured to reflect light, and wherein the reading unit includes a light projection portion configured to project light toward the reflection portion and an image sensor configured to detect light reflected from the reflection portion, and is configured to detect whether the conveyance guide is attached to the predetermined position on the basis of whether the image sensor detects light.

11. An image reading apparatus for reading an image on a sheet while conveying the sheet, the image reading apparatus comprising:

at least one processor operatively coupled to a memory, serving as:

a conveyance mechanism configured to convey the sheet;

a conveyance guide configured to be attachable and detachable with respect to the image reading apparatus, the conveyance guide configured to guide the sheet;

a sensor unit including a light projection portion configured to project light toward the conveyance guide and an image sensor configured to detect light projected by the light projection portion; and a processing unit configured to perform a reading operation of reading the image on the sheet while conveying the sheet and configured to determine whether to perform the reading operation on the basis of a detection result of the image sensor.

12. The image reading apparatus according to claim 11, wherein the sensor unit is a reading unit capable of reading an image on a sheet and is configured to be movable between a position at which the sensor unit reads the image on the sheet and a position at which the sensor unit is able to project light toward the conveyance guide.

13. The image reading apparatus according to claim 11, wherein the image sensor is configured to detect light reflected from the conveyance guide, and wherein the processing unit is configured to determine whether to perform the reading operation on the basis of a detection pattern that is detected on the basis of the light detected by the image sensor.

14. The image reading apparatus according to claim 11, wherein the conveyance guide includes a light shield portion that is located between the light projection portion and the image sensor in a case when the conveyance guide is attached to the image reading apparatus, and is configured to shield light directed from the light projection portion to the image sensor, and wherein the processing unit is configured to determine whether to perform the reading operation on the basis of whether the image sensor detects light.

15. The image reading apparatus according to claim 11, wherein the conveyance guide includes a reflection portion configured to reflect light projected from the light projection portion, and wherein the processing unit is configured to determine whether to perform the reading operation on the basis of whether the image sensor detects light reflected from the reflection portion.

* * * * *